US011668570B2

(12) United States Patent
Templer

(10) Patent No.: US 11,668,570 B2
(45) Date of Patent: Jun. 6, 2023

(54) BOAT SHARING SYSTEM

(71) Applicant: Lisa Templer, Antioch, CA (US)

(72) Inventor: Lisa Templer, Antioch, CA (US)

(*) Notice: Subject to any disclaimer, the term of this patent is extended or adjusted under 35 U.S.C. 154(b) by 0 days.

(21) Appl. No.: 18/074,462

(22) Filed: Dec. 3, 2022

(65) Prior Publication Data
US 2023/0097578 A1 Mar. 30, 2023

Related U.S. Application Data

(63) Continuation of application No. PCT/US2022/033905, filed on Jun. 17, 2022, which
(Continued)

(51) Int. Cl.
G01C 21/20 (2006.01)
G05D 1/00 (2006.01)
(Continued)

(52) U.S. Cl.
CPC ............ *G01C 21/203* (2013.01); *B63B 49/00* (2013.01); *G01C 21/3415* (2013.01);
(Continued)

(58) Field of Classification Search
CPC ........ G01C 21/20; G01C 21/34; G01C 21/36; G01C 21/38; G01C 21/203;
(Continued)

(56) References Cited

U.S. PATENT DOCUMENTS 7,130,742 B2 * 10/2006 Kobuya .................. G01C 21/26
348/E7.071
7,979,204 B2 * 7/2011 Kobuya .................. G06F 3/048
715/768
(Continued)

FOREIGN PATENT DOCUMENTS

CN 110785785 A * 2/2020 ...... B60W 60/00253
CN 110942363 A * 3/2020 ......... G01C 21/3438
(Continued)

OTHER PUBLICATIONS

"More friends than foes? The impact of automobility-as-a-service on the incumbent automotive industry" by Peter Wells et al.; Technological Forecasting and Social Change, vol. 154, May 2020, https://doi.org/10.1016/j.techfore.2020.119975 (Year: 2020).*
Amann, Volker; an abstract of "Consumer Acceptance, Barriers and Success Factors of Peer-to-Peer Carsharing in Perspective of Connected Car Services and Autonomous Vehicles". Doctoral thesis, WU Vienna University of Economics and Business. This version is available at: http://epub.wu.ac.at/5712/; (Year: 2018).*
(Continued)

*Primary Examiner* — Cuong H Nguyen
(74) *Attorney, Agent, or Firm* — David A. Belasco; Belasco Jacobs & Townsley, PC

(57) ABSTRACT

A boat sharing system includes a non-transitory computer readable memory for receiving and storing data for routes previously traveled. The route data includes starting and ending points and points of interest along the routes. The memory receives and stores data related to boat types, equipment for boating activities and boat drivers. A processing system accesses the memory and is configured to: display the stored data; receive and store route data and trip timing, boat type, equipment, boat driver requirements and activity desires for a present user; compare the present user's desired route, timing, activity, equipment and boat driver requirements with previously stored data. The system provides at least one previously stored set of route, boat, activity, equipment and operator data as an option for the present user; provides proposed timing, starting and ending points for the suggested route; and permits the present user to confirm selection of the suggested route.

26 Claims, 41 Drawing Sheets

Related U.S. Application Data is a continuation-in-part of application No. PCT/US2021/036425, filed on Jun. 8, 2021.

(51) Int. Cl.

| | | |
|---|---|---|
| *B63B 49/00* | (2006.01) | |
| *G01C 21/36* | (2006.01) | |
| *G08G 1/0969* | (2006.01) | |
| *G01C 21/34* | (2006.01) | |
| *B60W 50/14* | (2020.01) | |

(52) U.S. Cl.
CPC ..... *G01C 21/3682* (2013.01); *G01C 21/3697* (2013.01); *G08G 1/0969* (2013.01); *B60W 2050/146* (2013.01); *B60Y 2400/92* (2013.01)

(58) Field of Classification Search
CPC ............ G01C 21/3407; G01C 21/3415; G01C 21/3453; G01C 21/3697; G01C 21/3682; B63B 49/00; B60W 2050/146; B60Y 2400/92; G08G 1/0969
USPC .......................................................... 701/21
See application file for complete search history.

(56) References Cited

U.S. PATENT DOCUMENTS

| | | | | |
|---|---|---|---|---|
| 8,762,048 | B2 * | 6/2014 | Kosseifi | G01C 21/3415 |
| | | | | 701/410 |
| 9,014,974 | B2 * | 4/2015 | Venkatraman | G01S 5/015 |
| | | | | 701/470 |
| 9,255,807 | B2 | 2/2016 | Lee | |
| 10,237,696 | B2 * | 3/2019 | Softer | G01C 21/20 |
| 10,415,982 | B2 * | 9/2019 | Park | G01C 21/3617 |
| 2008/0077456 | A1 | 3/2008 | Meer | |
| 2011/0106436 | A1 | 5/2011 | Bill | |
| 2013/0144660 | A1 | 6/2013 | Martin | |
| 2013/0321178 | A1 | 12/2013 | Jameel | |
| 2013/0325521 | A1 | 12/2013 | Jameel | |
| 2014/0257867 | A1 | 9/2014 | Gay | |
| 2014/0324275 | A1 | 10/2014 | Stanek et al. | |
| 2019/0084369 | A1 | 3/2019 | Duan et al. | |
| 2019/0178672 | A1 * | 6/2019 | Woolley | G01C 21/3635 |
| 2019/0222484 | A1 | 7/2019 | Ricci | |
| 2020/0097863 | A1 * | 3/2020 | Hiruta | G06Q 10/0631 |
| 2020/0408538 | A1 * | 12/2020 | Raju | G01C 21/3661 |
| 2022/0114655 | A1 * | 4/2022 | Chen | G06Q 30/0625 |
| 2022/0204026 | A1 * | 6/2022 | Kim | G05D 1/02 |
| 2022/0214176 | A1 * | 7/2022 | Kim | B60W 40/06 |
| 2023/0055708 | A1 * | 2/2023 | Lee | B60W 30/10 |

FOREIGN PATENT DOCUMENTS

| | | | | |
|---|---|---|---|---|
| EP | 1569184 A2 * | 8/2005 | | G01C 21/34 |
| GB | 2489195 A | 9/2012 | | |
| JP | 6426099 B2 * | 11/2018 | | G01C 21/00 |
| WO | WO-2020138516 A1 * | 7/2020 | | G08G 1/0112 |
| WO | WO-2021090971 A1 * | 5/2021 | | B60W 30/18163 |
| WO | WO-2021246534 A1 * | 12/2021 | | G01C 21/34 |

OTHER PUBLICATIONS

"Reviewing environmental rebound effects from peer-to-peer boat sharing in Finland" by Warmington-Lundström, Jon Uppsala University, Disciplinary Domain of Science and Technology, Earth Sciences, Department of Earth Sciences; (Year: 2019).*

"Political economies and environmental futures for the sharing economy" Koen Frenken, Innovation Studies, Copernicus Institute of Sustainable Development, Utrecht University, PO Box 80115, 3508TC Utrecht, The Netherlands; .Phil. Trans. R. Soc. A 375: 20160367; http://dx.doi.org/10.1098/rsta.2016.0367 (Year: 2017).*

* cited by examiner

The App Found a Driver project My Boat II
date 4/24/2021 10:59 am

① Time to Make a Choice

Users will have a determine time to accept or decline driver. If the timer expires, the app will cancel the request. No punishment shall be required at this stage.

② Decline Driver

Users can decline driver matches if they don't like what they see in their profiles. By declining, users get taken to screen number 5, where they can send a request again. App should not pair them with previous declined driver. If users keeps declining and no more drivers are available app should tell users no more drivers in your pick up area.

③ Driver's Profile

If users wish to know more about their drivers, they can click on the image for more details. This will open a profile screen, and the timer will still keep going. This should allow them to feel more comfortable when selecting a driver.

④ Accept

This is the final screen before going back. Once users click on accept their trip starts. If they wish to cancel as the driver is on their way, some sort of fee should be taken from passengers.

Jimmy he could at the dock at 11:45 am

| Trips | Rating | Years |
|-------|--------|-------|
| 10 | 5.0 | 2 |

The Marina Dock 4
San Francisco Pier 39 Dock 7

$Total Price  VISA 2136  $90 once a driver confirms your request, any cancelation attempt will require a fee

Accept

Commuter  Trips  Profile

Drivers Profile project My Boat II
date 4/24/2021 11:26 am

① Detail Information
This will show details, such as experience, age, skills, and certifications that drivers have. This should appease passengers' worries.

② Back Button
This will take them to the previous screen, where they can accept or decline their drivers.

③ Timer Still Running
Users should still be aware that they have a determine time to make to confirm their drivers. So even if they are looking at the profile screen, we should still make them aware that time is running out.

— 114

Jimmy Drumman
45 years old

| TRIPS | EXPERIENCE | RATING |
|---|---|---|
| 10 | 15 YEARS | 4.7 |

— 114

- Has Certificated Captain's License
- Owns the Sail Boat
- 15 Years of Experience
- From San Francisco, CA My Skill
•Lorem ipsum dolor sit ament, •consectetur adipiscing elit. Gravida •oinare sit turpis ut. Ipsum toortor, •mauris ornare sed ut. Vulputate •gravida pretium nulla facilisi arc Commuter  Trips  Profile

BOAT ADMIN

CREATE TRIP — 130
SELECT DESTINATION LOCATION ON MAP — 158

TRIP NAME
[TRIP NAME]

TRIP DETAIL
◎ [SELECT PICKUP LOCATION ▾]
◉ [SELECT DESTINATION LOCATION ▾]

PRICE
[          ]

TRIP TIME ESTIMATE (IN MINUTES)
[          ]

[BACK]   [CONFIRM]

SET PICK-UP. YOU CAN FIND A LOCATION IN THREE WAYS. DRAG THE ORANGE ANCHOR TO SELECT A PICK-UP LOCATION, SEARCH AN ADDRESS OR SELECT AVAILABLE FROM THE LIST. THEN SELECT A DOCK NUMBER AND GIVE IT A NAME IF IT'S REQUIRED. THE PRESS ON CONFIRM.

FIG. 29

| MYBOAT 2 | | | | | BOAT ADMIN |
|---|---|---|---|---|---|
| DRIVER | | | | | |
| PASSENGERS | LIST OF TRIPS | | | | |
| TRIP ▾ | TRIPS LIST | | | | |
| PICKUP LIST<br>DESTINATION LIST | TRIP NAME | PICKUP DOCK | DESTINATION DOCK | PRICE | ESTIMATED TIME (IN MINUTE) ACTIONS |
| TRIP LIST | BIGMART TO HOT CHILLY | ⊙ BIGMART PICKUP | ⊙ HOT CHILLY RESTAURANT | 175 | 26 ◇ |
| BOAT TYPES | BIGMART TO WALES TRIP | ⊙ BIGMART PICKUP | ⊙ DE CAPITAL JAVA | 200 | 20 ◇ |
| NEARBY | DIVYA GYAN TO KUPONDOLE BIGMART | ⊙ DIVYA GYAN SECONDARY SCHOOL | ⊙ KUPONDOLE BIGMART | 250 | 10 ◇ |
| SERVICES | SHORT TRIP | ⊙ THE EMBARACADERO AT PIER 38, SAN FRANCISCO, CA | ⊙ THE EMBARACADERO | 100 | 30 ◇ |
| ACTIVE TRIPS | SOMEHWERE IS SF | ⊙ SAN FRANCISCO PICKUP | ⊙ SAN DESTINATION | 150 | 10 ◇ |
| COMPLETED TRIPS | | | | 5 ROWS ▾ |< < 1-5 OF 7 > >| |

MYBOAT 2 — BOAT ADMIN

LIST OF BOAT TYPES

| NAME | CAPACITY | ACTIVE | PRICE | SIZE | ACTIONS |
|---|---|---|---|---|---|
| CRUISE | 410 | 6 | 250 | LARGE | ✎ 🗑 |
| MINI | 8 | 19 | 75 | SMALL | ✎ 🗑 |
| BROKEN BOAT | 5 | 1 | 10 | SMALL | ✎ 🗑 |
| YACHT | 50 | 8 | 150 | SMALL | ✎ 🗑 |
| DECK BOATS | 250 | 1 | 175 | LARGE | ✎ 🗑 |

<1-5 OF 6>

- DRIVER
- PASSENGERS
- TRIP
  - PICKUP LIST
  - DESTINATION LIST
  - TRIP LIST
- BOAT TYPES
- NEARBY
- SERVICES
- ACTIVE TRIPS
- COMPLETED TRIPS

ERASE · ADD · RECENTLY ERASED

FIG. 32

MYBOAT 2
- DRIVER
- PASSENGERS
- TRIP ▽
  - PICKUP LIST
  - DESTINATION LIST
- TRIP LIST
- BOAT TYPES
- NEARBY
- SERVICES
- ACTIVE TRIPS
- COMPLETED TRIPS

BOAT ADMIN — 182

LIST OF PICKUP LOCATION — 202

⊕ CREATE DESTINATION

PICKUP LIST — 250

Q SEARCH ✕

| PICKUP LOCATION | PICKUP DOCK | ACTIONS |
|---|---|---|
| ⊙ PYAPHAL TOLE, KATHMANDU, BAGMATI | YETHKA | ✎ 🗑 |
| ⊙ MANGAL BAZAR, LALITPUR 44600, NEPAL | DIVYA GYAN SECONDARY SCHOOL | ✎ 🗑 |
| ⊙ 45 FREMONT ST, SAN FRANCISCO, CA | SAN PICKUP | ✎ 🗑 |
| ⊙ RONAL REAGAN WASHINGTON NATIONAL AIRPORT (DCA), 2401 SMITH BLVD, ARLINGTON | WASHINGTON PICKUP | ✎ 🗑 |
| ⊙ 1140 N HARBOR DR, SAN DIEGO, CA | SAN DIEGO PICKUP | ✎ 🗑 |

5 ROWS ▽   ⫷   ⟨1-5 OF 13⟩   ⫸

BOAT SHARING SYSTEM

RELATED APPLICATION

The instant application is a continuation of PCT Application No. PCT/US22/033905, filed Jun. 17, 2022, which is a continuation-in-part of PCT Application No. PCT/US21/36425, filed Jun. 8, 2021, both now pending and entirely incorporating the disclosure thereof.

FIELD OF INVENTION

This invention relates to the field of transportation scheduling and more particularly to providing a boating experience including the selection of the vessel, crew and additional equipment on demand through the use of automated systems.

BACKGROUND OF THE INVENTION

Boat-related sport and recreation activities have become increasingly popular. Activities such as cruising, sailing, house boating, fishing, waterskiing, wakeboarding and parasailing all require significant investment in the vessel and equipment as well as a substantial knowledge to operate and maintain safely. Add to this the concept that participants in these activities often like to select diverse locations to enjoy these activities and the need for a Boat Sharing system becomes evident. The present invention allows a user to reserve a boat with a properly trained and certified operator, equipped with the necessary additional gear at a desired port location at a specified date and time for his selected activity. The system will allow the user to verify the qualification of the boat driver, specifics of route and equipment and price of the outing prior to engagement. The user may read reviews by past participants and provide reviews upon completion of an outing. The following are examples of systems that have been developed to address the desires of the recreational boating community.

U.S. Patent Application 2008/077456, published for Meer, discloses an internet-based infrastructure for delivering boat rental services to a consumer. A consumer may request to rent a boat, along with necessary equipment/facilities, from the rental company via the internet. The rental company delivers the boat-trailer combination at a pre-determined time to the consumer's location, using a company vehicle, from where the user/consumer may hitch the boat-trailer combination to the site of his/her own choice, using his/her own vehicle. As an alternative, the rental company may also drop the boat-trailer combination to a central drop-off location easily accessible to the user. After the trip is completed, the user recombines the boat-trailer combination at the site of the trip, hitches it using his/her own vehicle and brings it back to his/her residential location or the central drop-off location, from where the rental company can return the boat-trailer back to its inventory.

G.B. Patent No. 2489195, issued to Bacon et el., discloses an online, web-based system that allows different users/boat owners to book berths for their boats at a Marina. The system may also function as a downloadable dedicated App residing in the smartphone of users. Similarly, owners of different berths can register on the platform and lease out their berths, whenever they are available. In one embodiment, the server of the communication network enables passage plans to facilitate boat owners or crew to search for crew members or to facilitate crew members to search for boats.

U.S. Pat. No. 9,255,807, issued to Lee et al. discloses an apparatus for allowing multiple users connected to a server by a communication network to input desired route characteristics information, based on the excursion activities they are interested in, including boating, water skiing and so forth. Inputting the route characteristics information may allow the user to select a desired boat, the necessary equipment and the preferred route/site. The apparatus stores information/data related to routes travelled by previous users, their experiences and recommendations. Based on the desired route characteristics, the apparatus suggests at least one of the stored routes to the user. Further, multiple routes suggested by the apparatus can be indicated in the form of a color-coded heat map to the user's device.

U.S. Patent Application 2013/0144660, published for Martin, discloses a web-based apparatus, which facilitates a user availing himself of a service provided by a rental company, wherein the service may be a boat rental service. When booking the service online, the user may specify customized equipment that he/she needs his/her boat to be equipped with, the travel route and the approximate time by when the user is ready to pick-up the boat at the location of the rental company. The server may also estimate an approximate travel time between any two locations entered by the user, wherein the locations correspond to the intended route of travel entered by the user.

It is an objective of the present invention to provide a rapid response online system for scheduling and reserving a diverse variety of boating activities and experiences. It is a further objective to provide a system that provides boats manned by experienced and vetted operators. It is a still further objective of the invention to provide boats equipped with all of the necessary equipment for the boating activities contemplated. It is still a further objective to provide a system that identifies activity costs and allows for online payments. Finally, it is an objective of the present invention to provide a system that includes reviews of past boating activities, operators and equipment and provides the user with a facility to add a review for others to see.

While some of the objectives of the present invention are disclosed in the prior art, none of the inventions found include all of the requirements identified.

SUMMARY OF THE INVENTION

The present invention addresses all of the deficiencies of prior art boat sharing systems and satisfies all of the objectives described above.

(1) A boat sharing system may be constructed from the following components. A non-transitory computer readable memory for receiving and storing route data for routes previously traveled by users is provided. The route data includes starting and ending points and points of interest along the routes. The non-transitory computer readable memory receives and stores data related to boat types, equipment for boating activities and boat drivers provided.

A processing system accesses the computer readable memory and is configured to: display previously stored route data, boat types, activities and equipment and boat drivers provided; receive and store route data and trip timing for at least one route desired by a present user; receive and store data related to a boat type, equipment and activity desires of the present user; receive and store data related to boat driver requirement of the present user; and compare the present user's desired route, timing, activity, equipment and boat driver requirements with previously stored route, boat, activity, equipment and boat driver data.

The system provides at least one previously stored set of route, boat, activity, equipment and operator data as an option for the present user; provides suggested timing, starting and ending points for the suggested route; and permits the present user to confirm selection of the suggested route.

A portable and installable telemetry system for monitoring a fleet of rental vessels is provided. The telemetry system includes one or more rental vessel kits, each kit including a plurality of parameter monitors, each such monitor having the capability of sensing a present level of a selected parameter and transmitting a parameter monitor signal corresponding to that level. A base station is provided. The base station includes a receiving apparatus configured to receive signals from the one or more parameter monitors. One or more data processing units are provided. The one or more data processing units are configured to process signals received from said parameter monitors to construct one or more status indicators related to said parameter monitor signals. An alarm device is provided. The alarm device is configured to indicate an alarm condition in response to one or more status indicators indicating one or more conditions preselected as alarm conditions. Each parameter monitor includes means for operational attachment to a location on or within the rental vessel, as required for parameter level sensing.

(2) In a variant of the invention, a mapping system is provided. The mapping system provides the user with a real-time visual image illustrating the arrival of the boat at a route starting point, progress of the boat along a selected route and anticipated arrival at a selected ending point.

(3) In another variant, a costing module is provided. The costing module provides costing data for previously traveled routes and providing a determined cost for the present user's desired route, activities, equipment and boat driver.

(4) In still another variant, a user profile module is provided. The user profile module providing for entry of the present user's contact data, family members or other passengers, special needs, and financial data, including credit card data, the financial data is available for settling route costing.

(5) In yet another variant, an operator qualification database is provided. The operator qualification database provides data regarding the skills and experience of available boat drivers, related safety records, certifications, special qualifications, boat experience and ratings, the operator qualification database is available to prospective users prior to the scheduling of a desired route.

(6) In a further variant, a route rating module is provided. The route rating module provides a tool for the present user to rate and comment on the selected route, boat, activities, equipment and boat driver, the route ratings and comments submitted by users to be available to prospective users for review.

(7) In still a further variant, a user rating module is provided. The user rating module provides a tool for the boat driver to rate and comment on his experience with the present user, the ratings and comments to be available for review by other boat drivers.

(8) In yet a further variant, a user onboarding module is provided. The user onboarding module provides tools for receiving a present user's login and registration information, viewing suggested routes, selecting desired boat type, selecting starting and ending points, selecting desired activities, selecting trip date, time and duration, identifying desired equipment, identifying boat driver qualifications, requesting custom route features and confirming route request and payment data.

(9) In still a further variant, an operator onboarding module is provided. The operator onboarding module provides tools for receiving a boat driver's login and registration information, scheduled availability, the operator to review present route requests, review ratings of present user, accept or reject requested route, confirm route completions and payment.

(10) In yet a further variant of the invention, at least one system administration module is provided. The at least one system administration module provides written and graphical reports on present users serviced by the system, their routes, progress on the routes and payment status, boat drivers currently employed by the system, the boats in use by the boat drivers, equipment in use and future availability for the boat drivers.

(11) In another variant of the invention, the boat sharing system is accessible to the users and boat drivers via cellular telephone systems and equipment.

(12) In still another variant, the selected parameter identifies vessel distance traveled.

(13) In yet another variant, the selected parameter identifies vessel speed.

(14) In a further variant, the selected parameter identifies route elapsed time.

(15) In still a further variant, the selected parameter identifies vessel fuel remaining.

(16) In yet a further variant, the selected parameter identifies weather conditions,

(17) In another variant, the selected parameter identifies emergency equipment levels.

(18) In still another variant, the selected parameter identifies a fire extinguisher count.

(19) In yet another variant, the selected parameter identifies onboard air quality levels.

(20) In a further variant, the selected parameter identifies vessel engine RPM level.

(21) In still a further variant, the selected parameter identifies vessel engine temperature.

(22) In yet a further variant, the selected parameter identifies vessel engine oil pressure.

(23) In another variant, the selected parameter identifies vessel engine service hours.

(24) In still another variant, the selected parameter identifies vessel oil temperature.

(25) In a further variant, a driver management module is provided. The driver management module provides a screen for input of driver identification and contact information, qualifications, experience, certificates, photos of boats for which the driver is qualified and driver banking information, a screen for displaying driver certificates, a screen for searching for qualified drivers, a screen for displaying driver search results, a screen for displaying a profile of a selected driver and a screen for displaying a trip history for the selected driver.

(26) In still a further variant, a passenger management module is provided. The passenger management module provides a screen for input of passenger identification, contact information, and passenger banking information, a screen for searching for a particular passenger, a screen for displaying a list of passengers, a screen for displaying details of a present selected trip, and a screen for displaying the particular passenger's trip history.

(27) In yet a further variant, a boat information management module is provided. The boat information management module provides a boat category listing, a screen for adding boats to the boat category listing and a screen displaying recently erased boat listings.

(28) In a final variant, a trip management module is provided. The trip management module provides a listing of available trips, maps of available trips, listing of presently active trips, maps of presently active trips, a listing of pick-up locations, maps of pick-up locations, a listing of destination locations, maps of destination locations, a listing of nearby locations, maps of nearby locations, a listing of conditions affecting a selected destination for a selected trip, a listing of erased trips, a screen for editing a destination location for a whole trip, a screen for adding additional services to a trip, a listing of completed trips, a screen for creating a destination location, a screen for creating a pick up location, a screen for creating a trip.

An appreciation of the other aims and objectives of the present invention and an understanding of it may be achieved by referring to the accompanying drawings and the detailed description of a preferred embodiment.

DESCRIPTION OF THE DRAWINGS

FIG. 10 is a plan view of the application of the FIG. 1 embodiment with explanatory notes for accepting or declining a proposed boat driver or moving to the boat driver's profile;

FIG. 11 is a plan view of the application of the FIG. 1 embodiment with explanatory notes for viewing a boat driver's profile;

Figure 21:
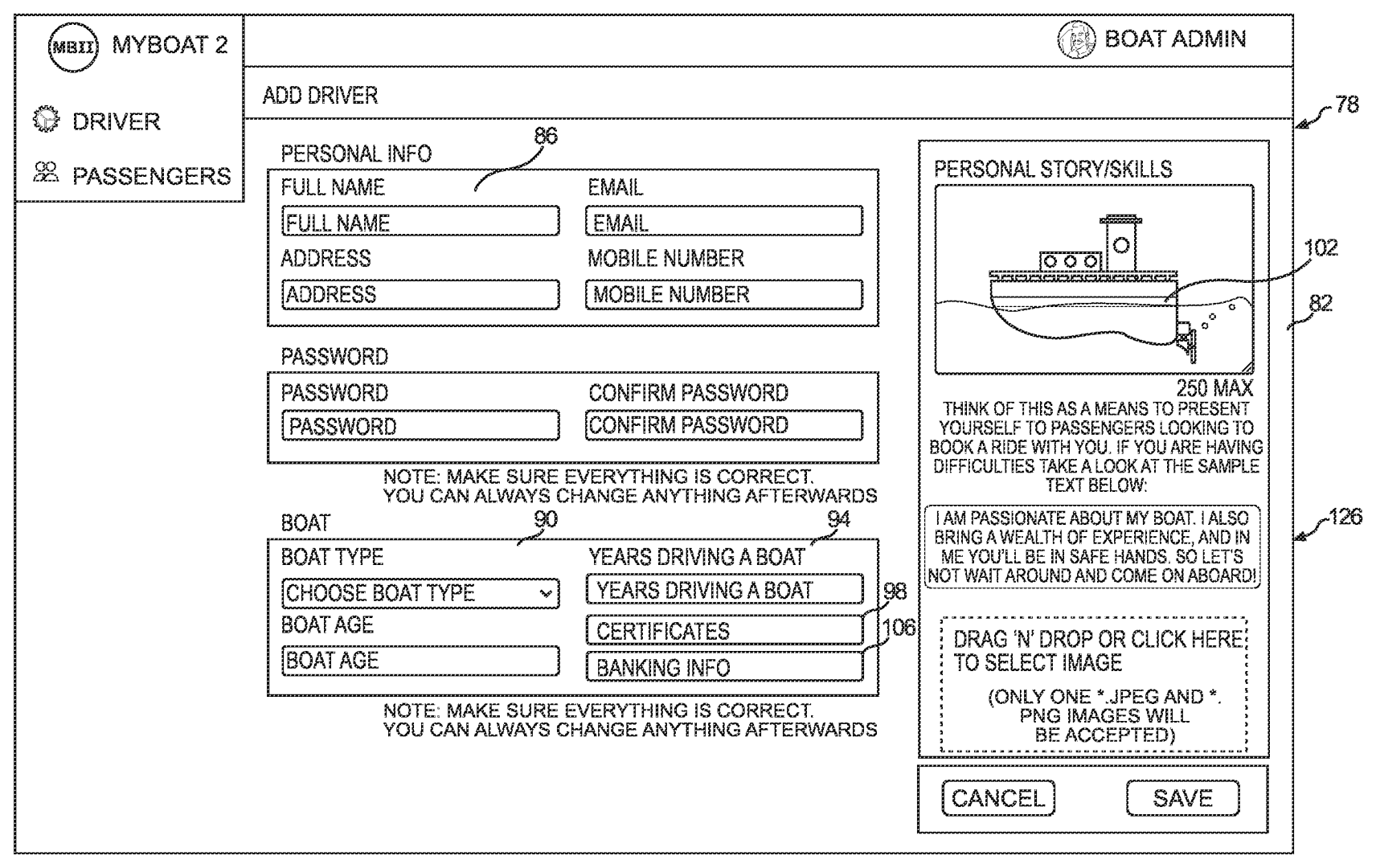

FIG. 21 is a plan view of the application of the FIG. 1 embodiment with explanatory notes for the driver management module including a screen for input of driver identification and contact information, qualifications, experience, certificates, photos of boats for which the driver is qualified and driver banking information;

Figure 25:
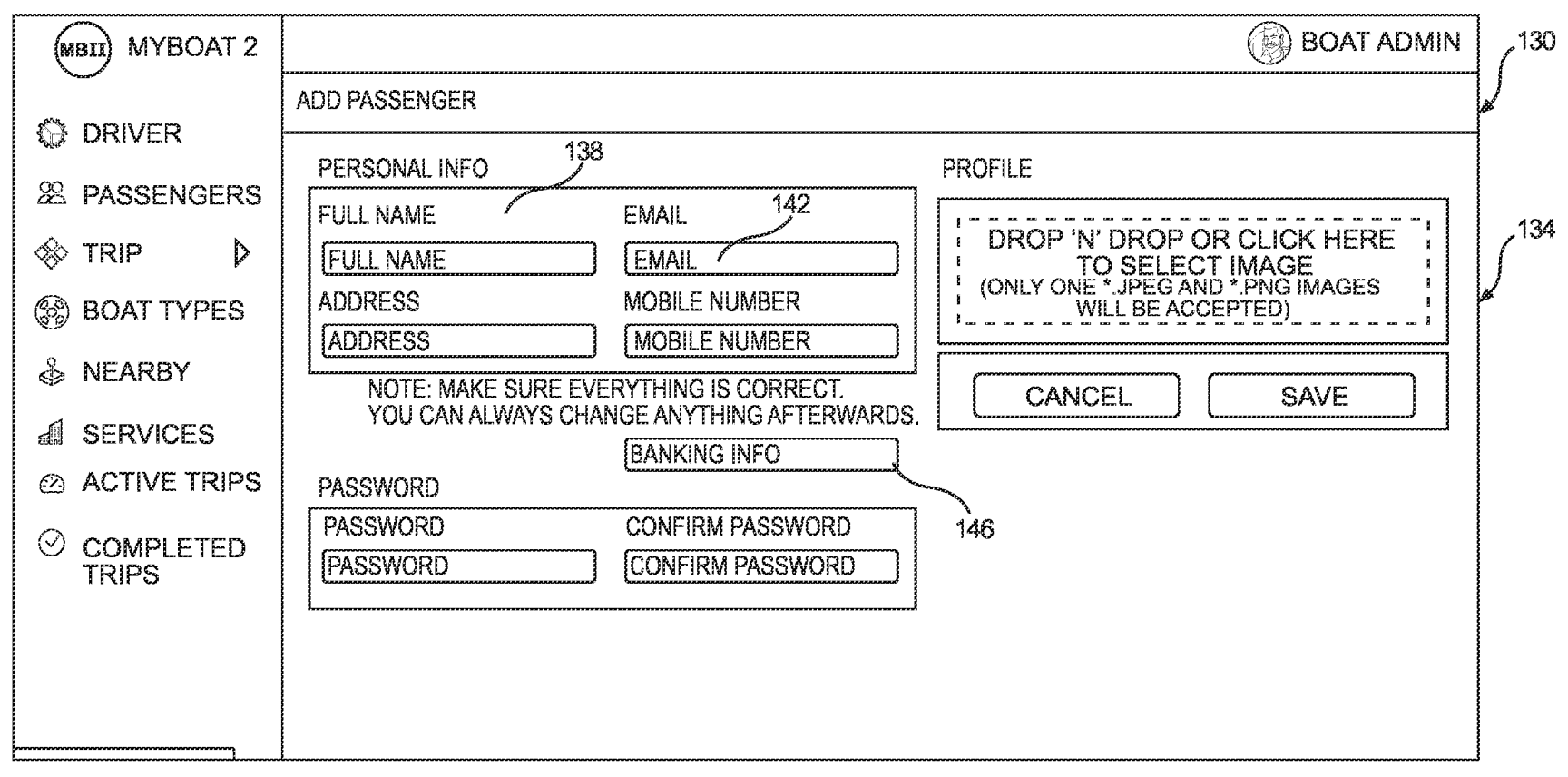

FIG. 25 is a plan view of the application of the FIG. 1 embodiment with explanatory notes for the passenger management module including a screen for input of passenger identification, contact information, and passenger banking information;

FIG. 29 is a plan view of the application of the FIG. 1 embodiment with explanatory notes for the passenger management module including a screen for displaying details of a present selected trip;

FIG. 30 is a plan view of the application of the FIG. 1 embodiment with explanatory notes for the passenger management module including a screen for displaying the particular passenger's trip history;

FIG. 31 is a plan view of the application of the FIG. 1 embodiment with explanatory notes for boat information management module;

FIG. 32 is a plan view of the application of the FIG. 1 embodiment with explanatory notes for the trip management module including a listing of pick-up locations;

DETAILED DESCRIPTION OF THE PREFERRED EMBODIMENT (1) As illustrated in FIGS. 1-18, a boat sharing system 10 providing the desired features may be constructed from the following components. As illustrated in FIGS. 1-3, a non-transitory computer readable memory 14 for receiving and storing route data 18 for routes 22 previously traveled by users 24 is provided. The route data 18 includes starting 26 and ending 30 points and points of interest 34 along the routes 22. The non-transitory computer readable memory 14 receives and stores data related to boat types 38, equipment 42 for boating activities 54 and boat drivers 46 provided.

Figure 1:
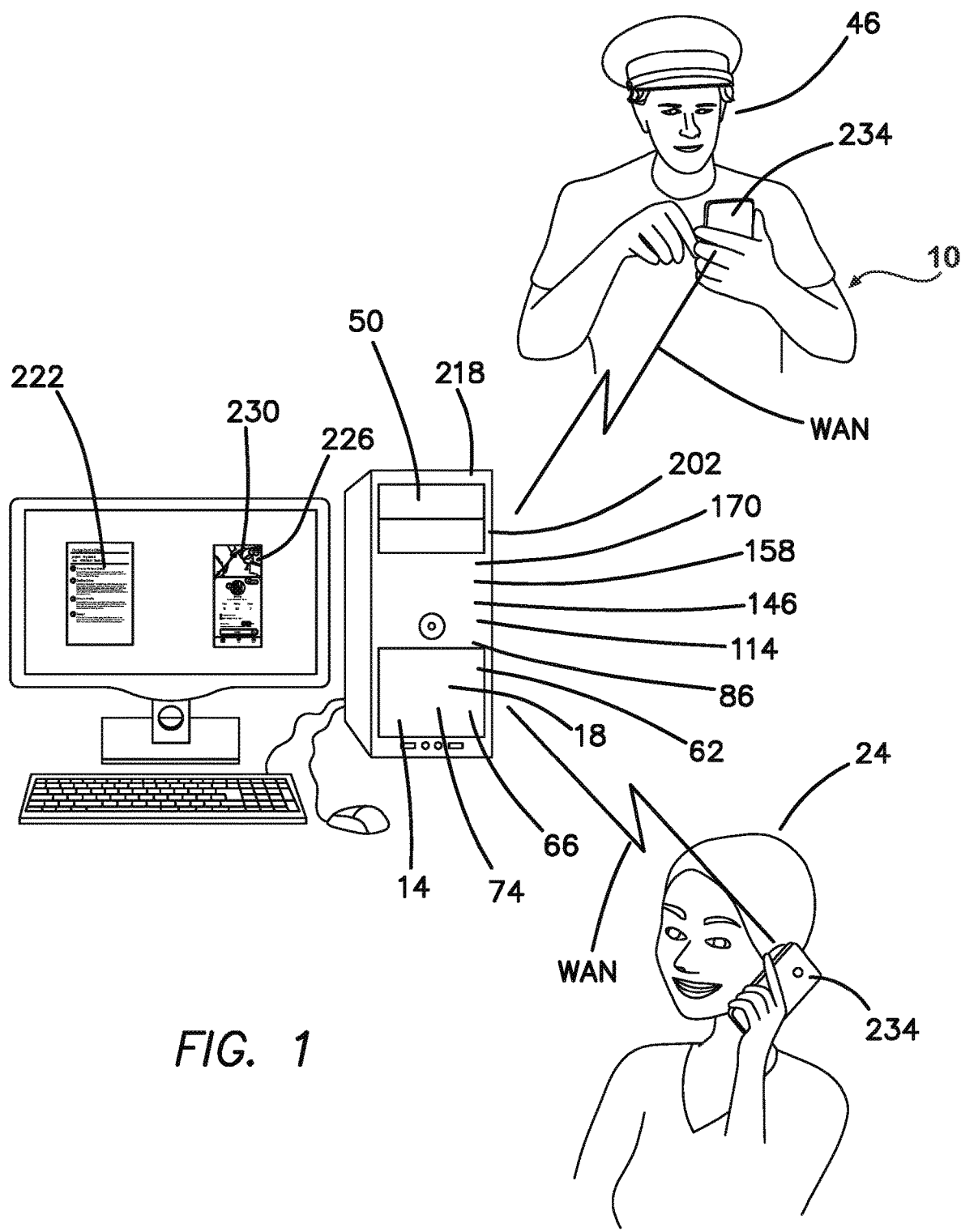
FIG. 1 is a schematic illustrating the non-transitory computer readable memory and processing system, Wide Area Network and cellular telephone equipment of the Boat Sharing System.

A processing system 50 accesses the computer readable memory 14 and is configured to: display previously stored route data 18, boat types 38, activities 54 and equipment 42 and boat drivers 46 provided; receive and store route data 18 and trip timing 58 for at least one route 22 desired by a present user 24; receive and store data related to a boat type 38, equipment 42 and activity 54 desires of the present user 24; receive and store data related to boat driver requirement 62 of the present user 24; and compare the present user's 24 desired route 22, timing 58, activity 54, equipment 42 and boat driver requirements 62 with previously stored route 18, boat 38, activity 54, equipment 42 and boat driver data 46. The system 10 provides at least one previously stored set of route 18, boat 38, activity 54, equipment 42 and operator 46 data as an option for the present user 24; provides suggested timing 58, starting 26 and ending 30 for the suggested route 22; and permits the present user 24 to confirm selection of the suggested route 22.

Figure 19:
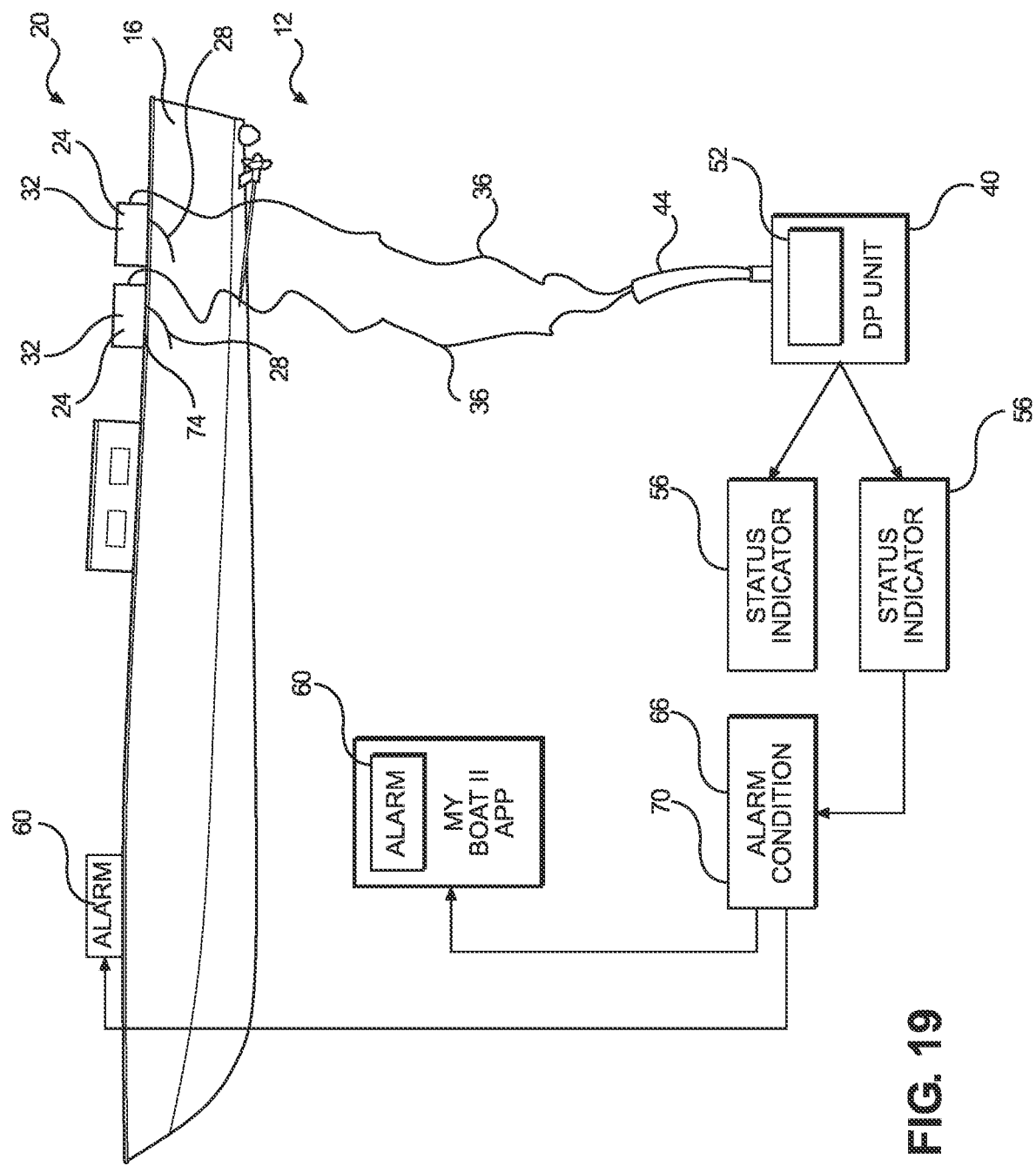
FIG. 19 is a schematic view of the portable and installable telemetry system for monitoring a fleet of rental vessels as employed in the FIG. 1 embodiment.

As illustrated in FIG. 19, a portable and installable telemetry system 12 for monitoring a fleet of rental vessels 16 is provided. The telemetry system 12 includes one or more rental vessel kits 20, each kit 20 includes a plurality of parameter monitors 24, each such monitor 24 having the capability of sensing a present level 28 of a selected parameter 32 and transmitting a parameter monitor signal 36 corresponding to that level 28. A base station 40 is provided. The base station 40 includes a receiving apparatus 44 configured to receive signals 36 from the one or more parameter monitors 24. One or more data processing units 52 are provided. The one or more data processing units 52 are configured to process signals 36 received from said parameter monitors 24 to construct one or more status indicators 56 related to said parameter monitor signals 36. An alarm device 60 is provided. The alarm device 60 is configured to indicate an alarm condition 66 in response to one or more status indicators 56 indicating one or more conditions 70 preselected as alarm conditions 66. Each parameter monitor 24 includes means for operational attachment to a location 74 on or within the rental vessel 16, as required for parameter level sensing.

(2) In a variant of the invention, as illustrated in FIGS. 4-10 and 12-17 a mapping system 66 is provided. The mapping system 66 provides the user 24 with a real-time visual image 70 illustrating the arrival of the boat 38 at a route starting point 26, progress of the boat along a selected route 22 and anticipated arrival at a selected ending point 30.

Figure 2:
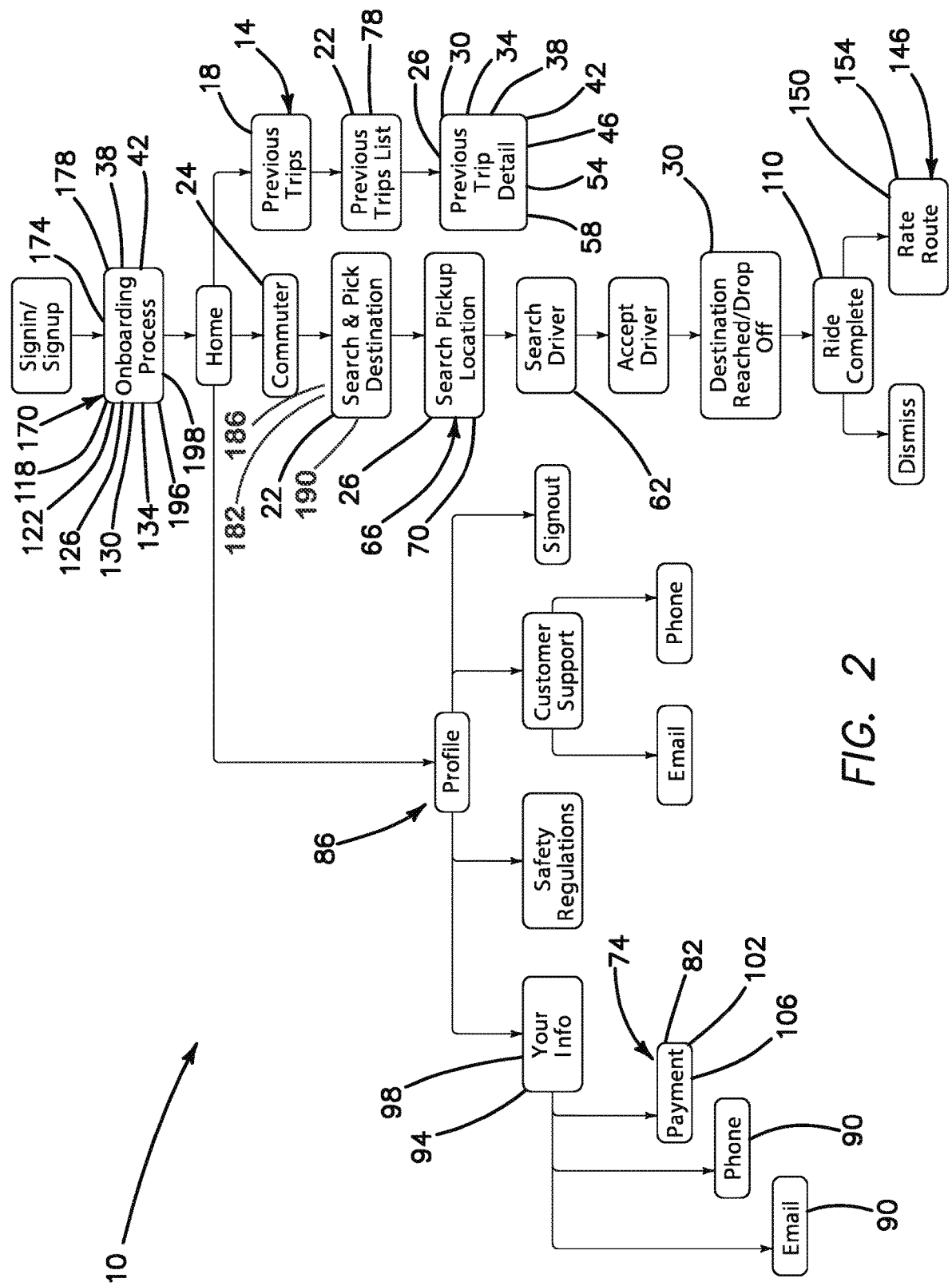
FIG. 2 is a flow chart illustration the FIG. 1 embodiment drawn to the functionality interfaces of the system for the user.
Figure 3:
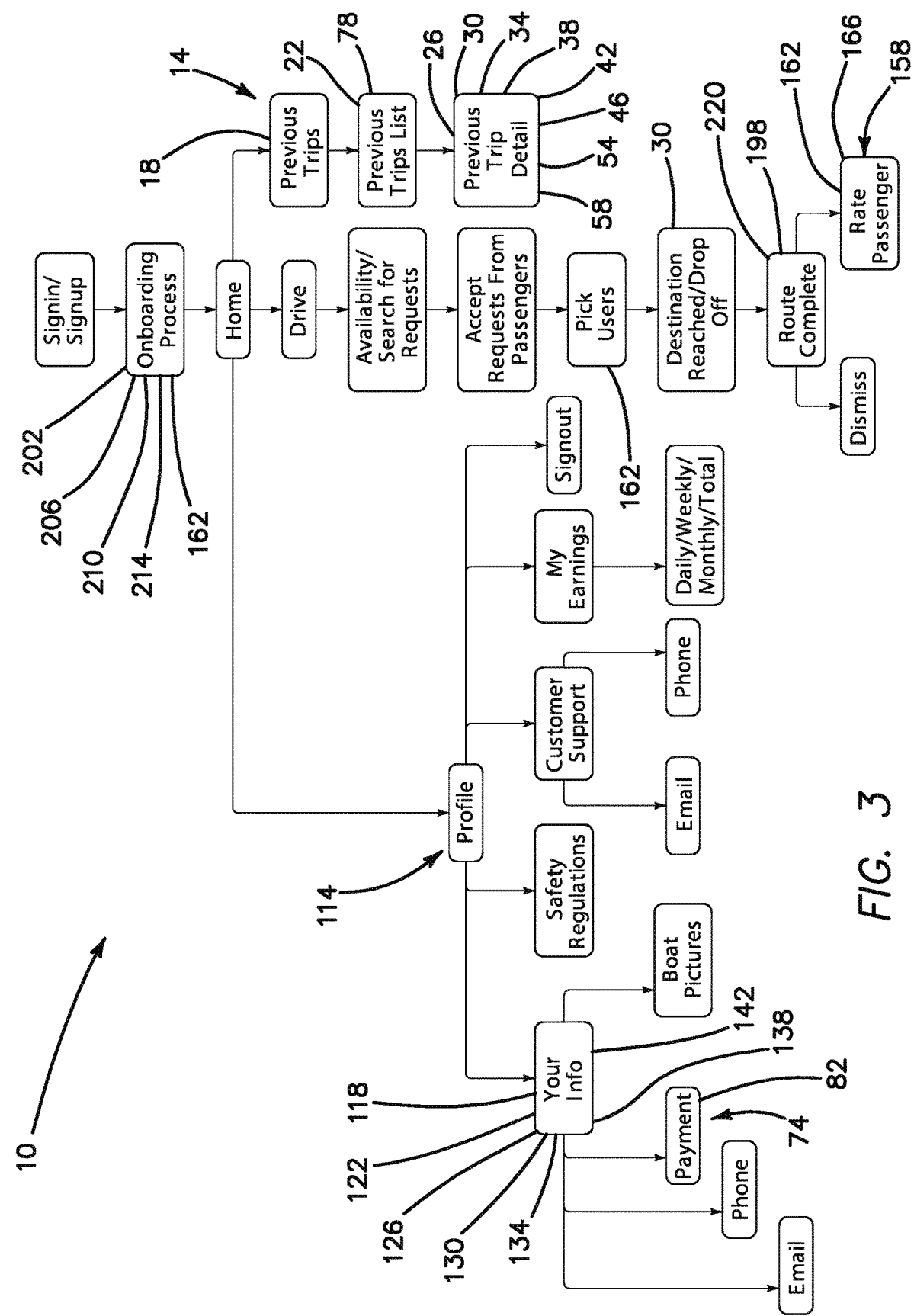
FIG. 3 is a flow chart illustration the FIG. 1 embodiment drawn to the functionality interfaces of the system for the boat driver.
Figure 4:
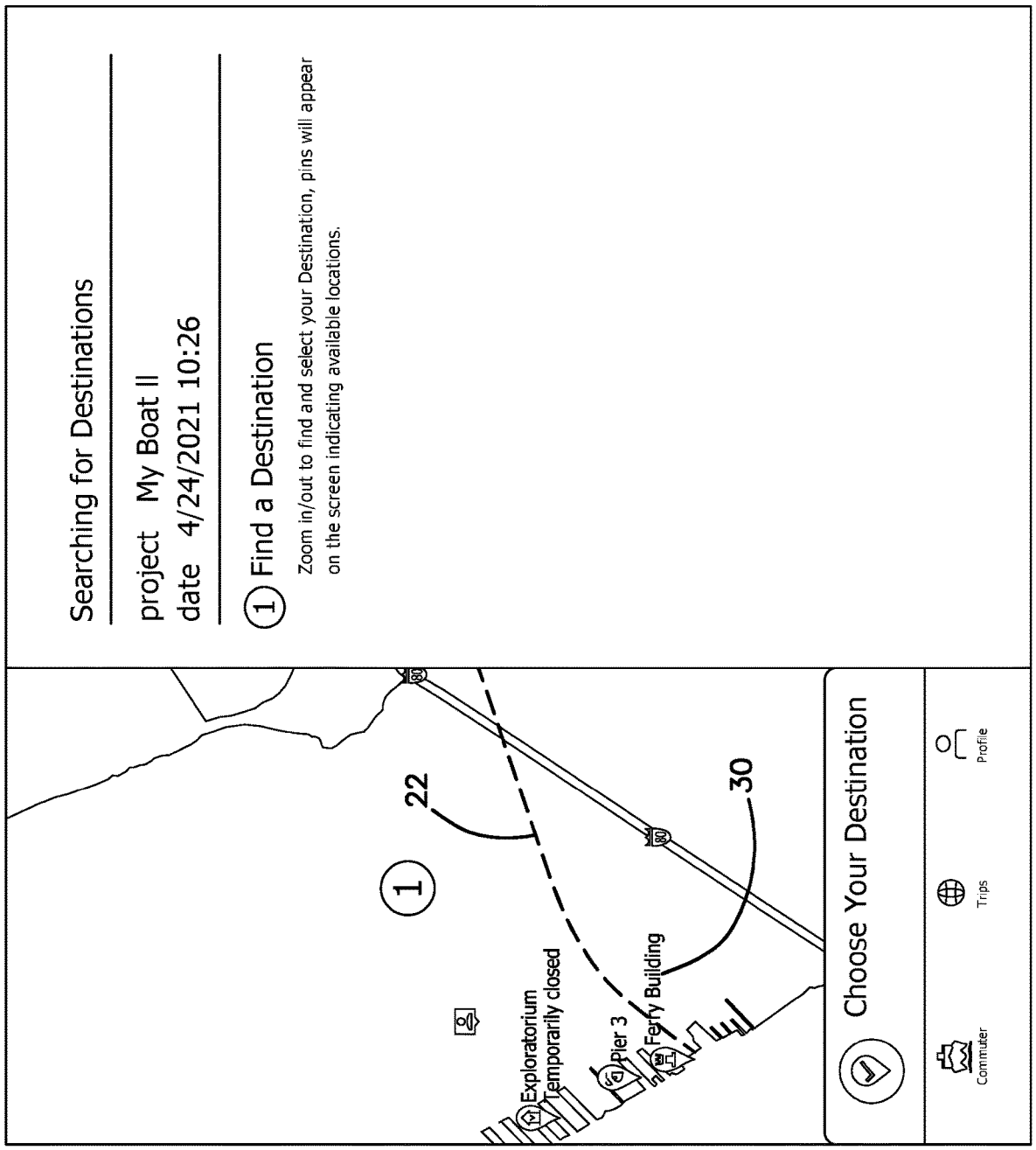
FIG. 4 is a plan view of the application opening screen for the FIG. 1 embodiment with explanatory notes for finding a trip destination.
Figure 5:
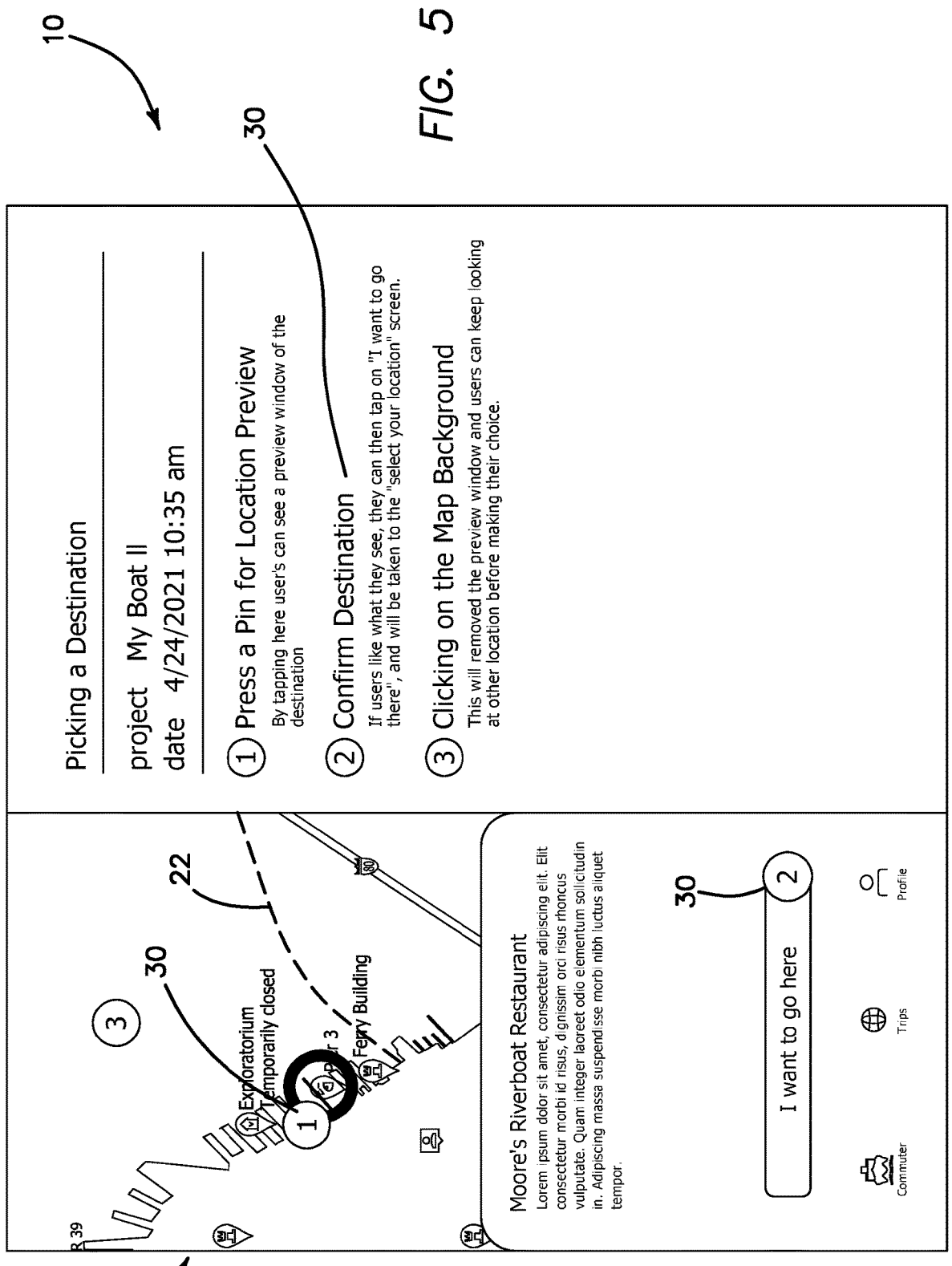
FIG. 5 is a plan view of the application of the FIG. 1 embodiment with explanatory notes for picking and confirming a trip destination.
Figure 6:
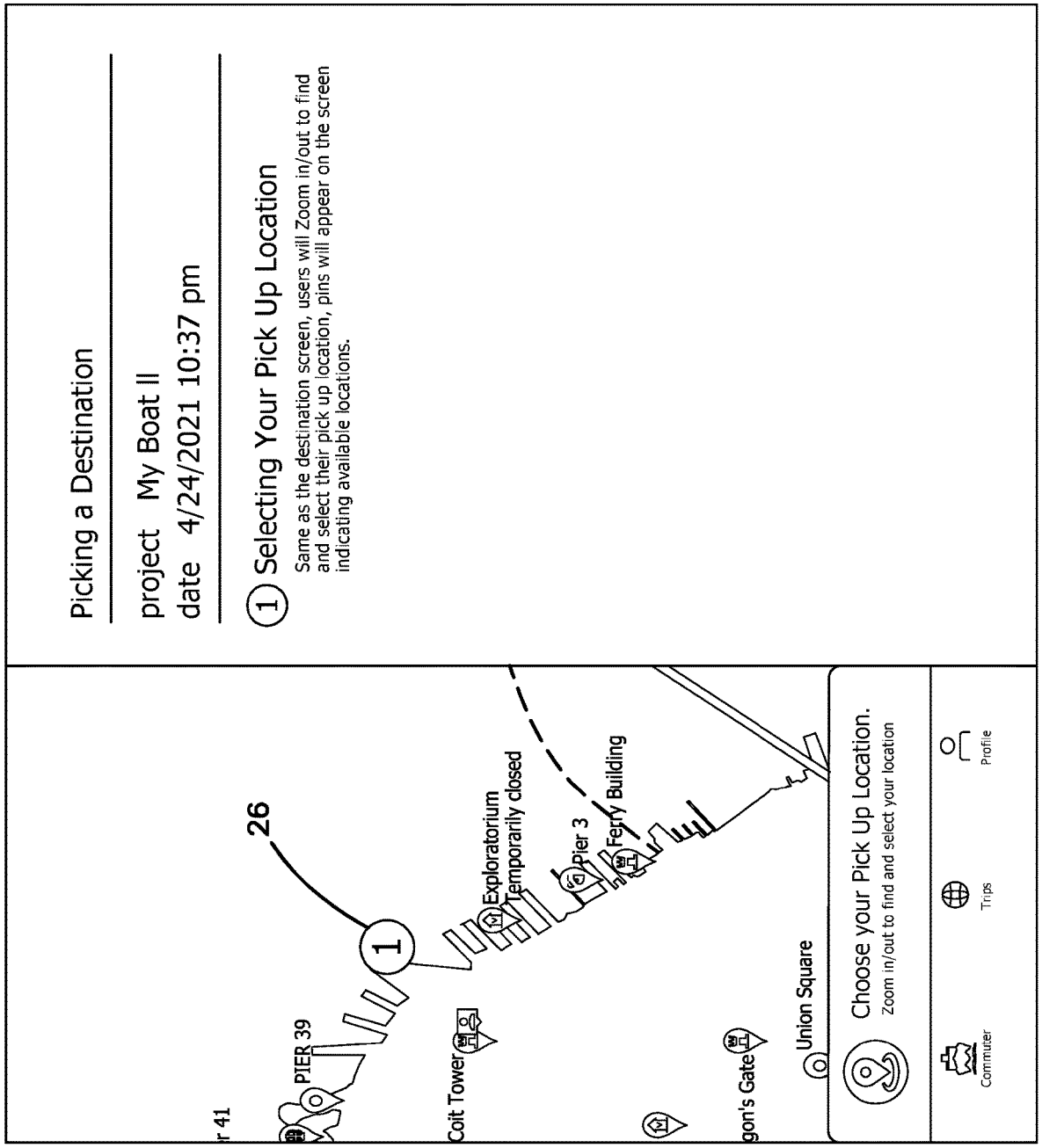
FIG. 6 is a plan view of the application of the FIG. 1 embodiment with explanatory notes for finding a pick-up location.
Figure 7:
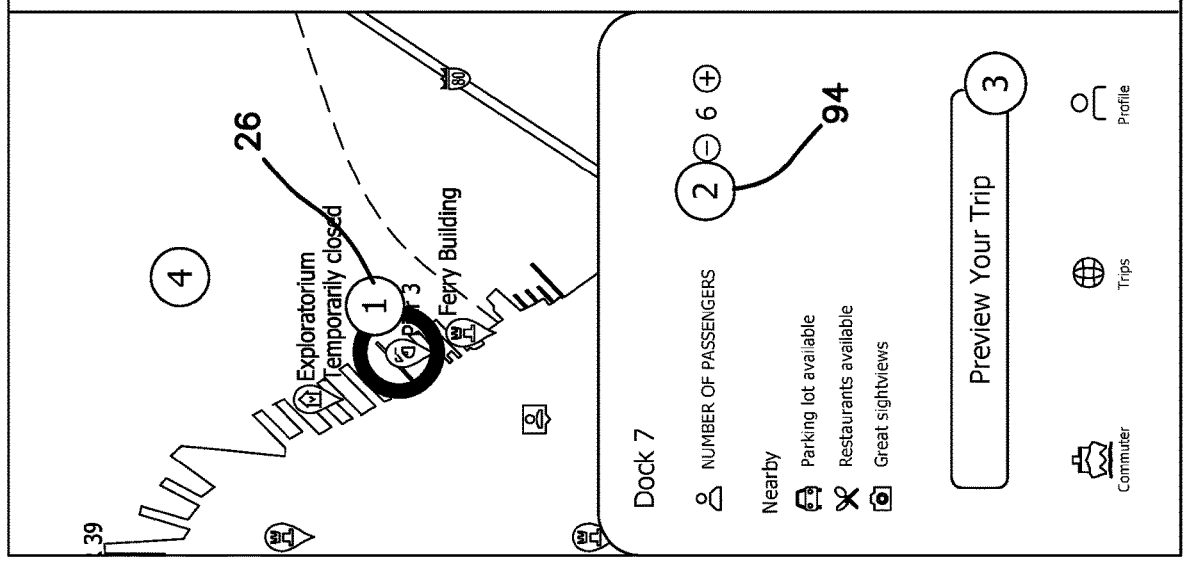
FIG. 7 is a plan view of the application of the FIG. 1 embodiment with explanatory notes for confirming the pick-up location, number of passengers and previewing trip details.
Figure 8:
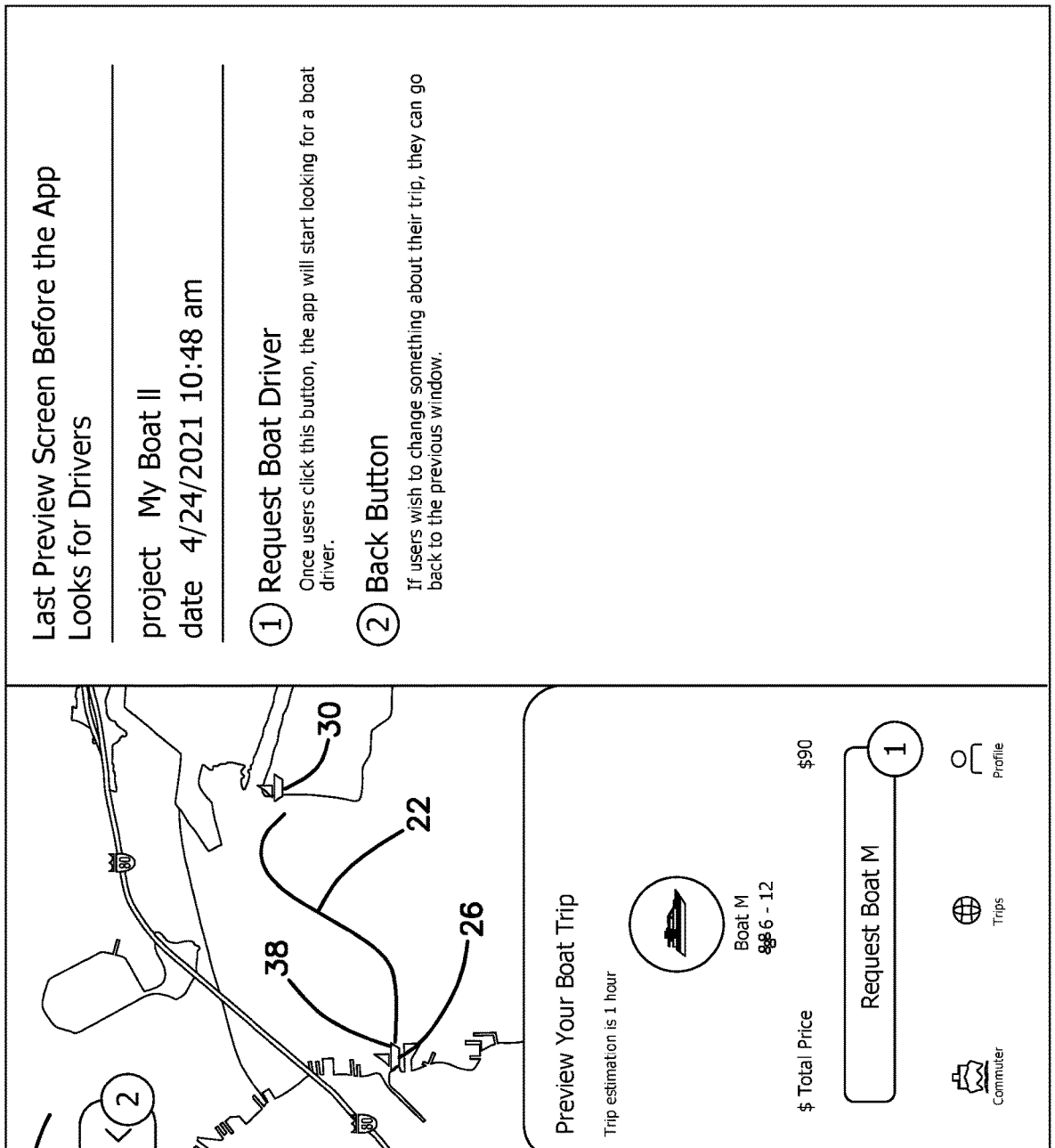
FIG. 8 is a plan view of the application of the FIG. 1 embodiment with explanatory notes for requesting a boat and boat driver.
Figure 9:
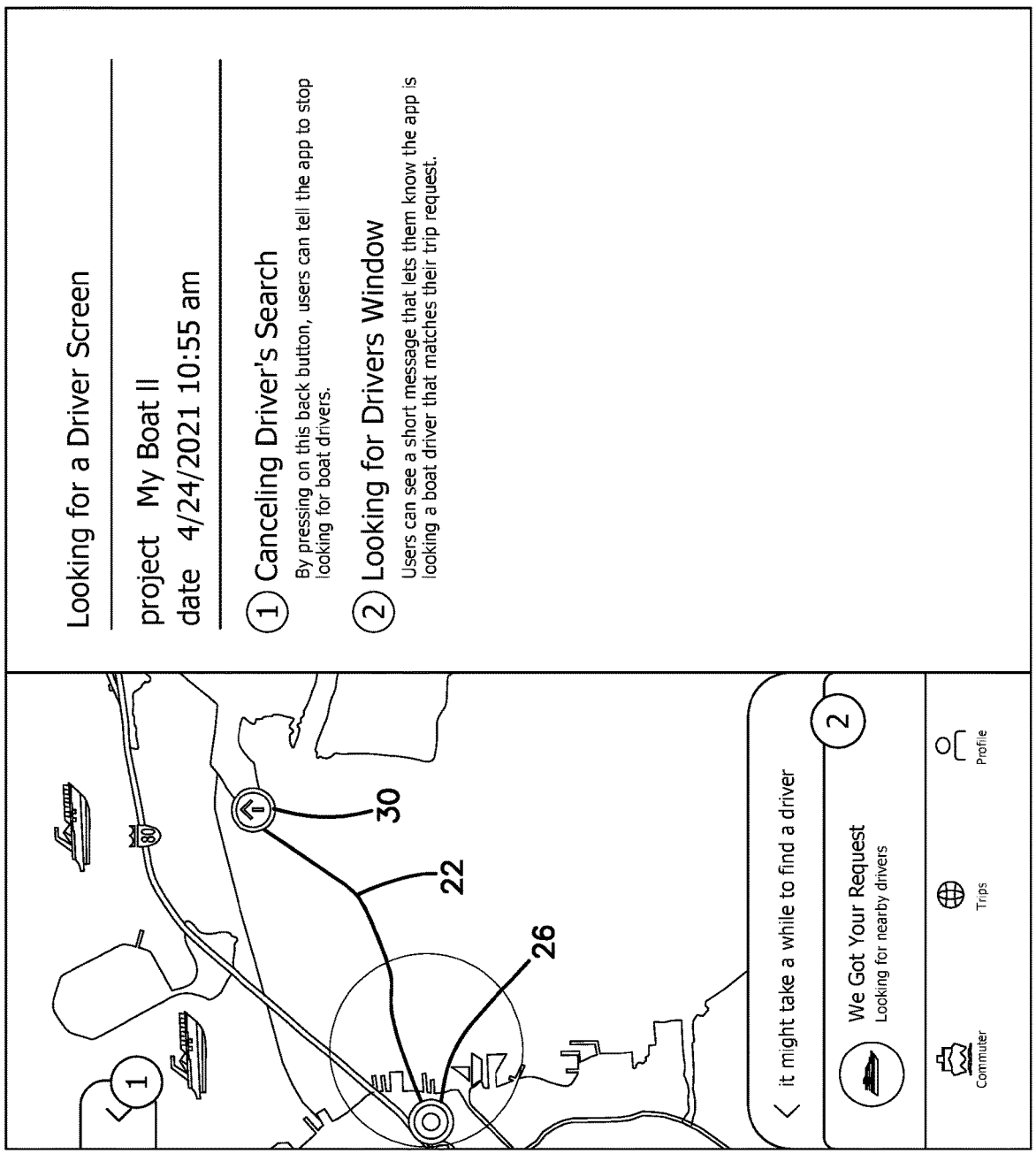
FIG. 9 is a plan view of the application of the FIG. 1 embodiment with explanatory notes for looking for and possibly canceling a search for a boat driver.
Figure 12:
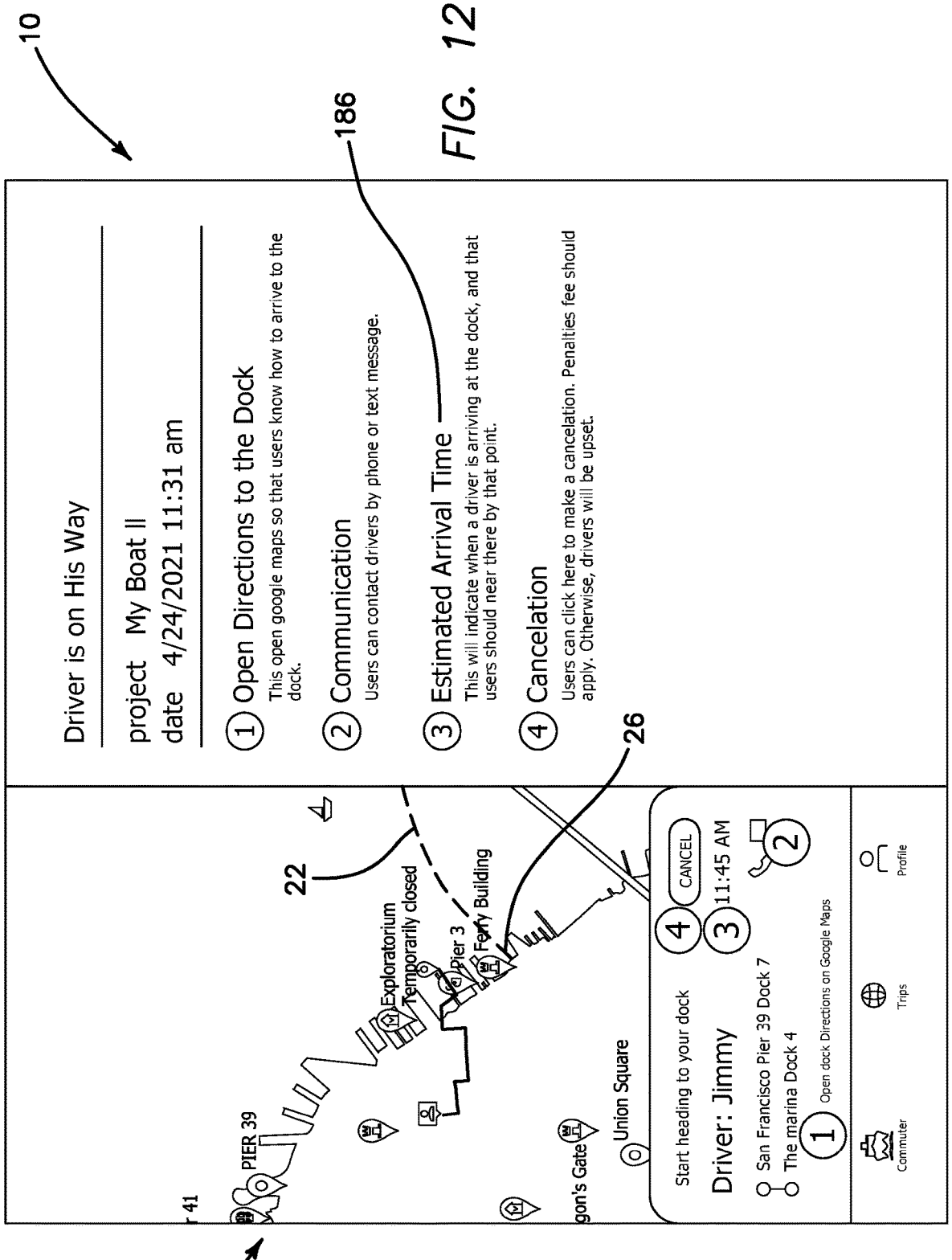
FIG. 12 is a plan view of the application of the FIG. 1 embodiment with explanatory notes for finding directions to the pick up dock location, communicating with the boat driver, finding the estimated arrival time for the boat driver, and possibly canceling the selected trip.
Figure 13:
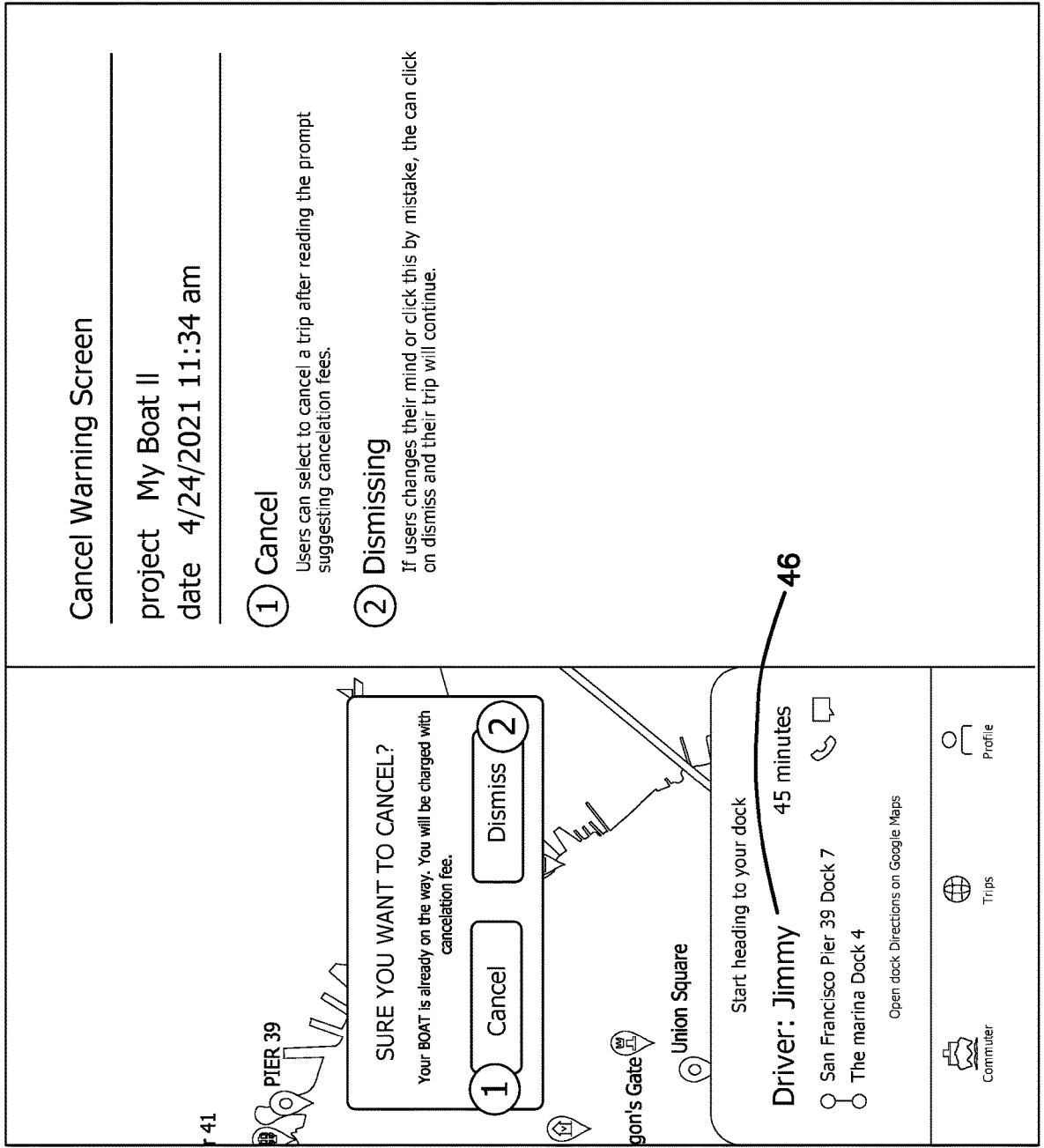
FIG. 13 is a plan view of the application of the FIG. 1 embodiment with explanatory notes providing a warning about trip cancellation fees.
Figure 14:
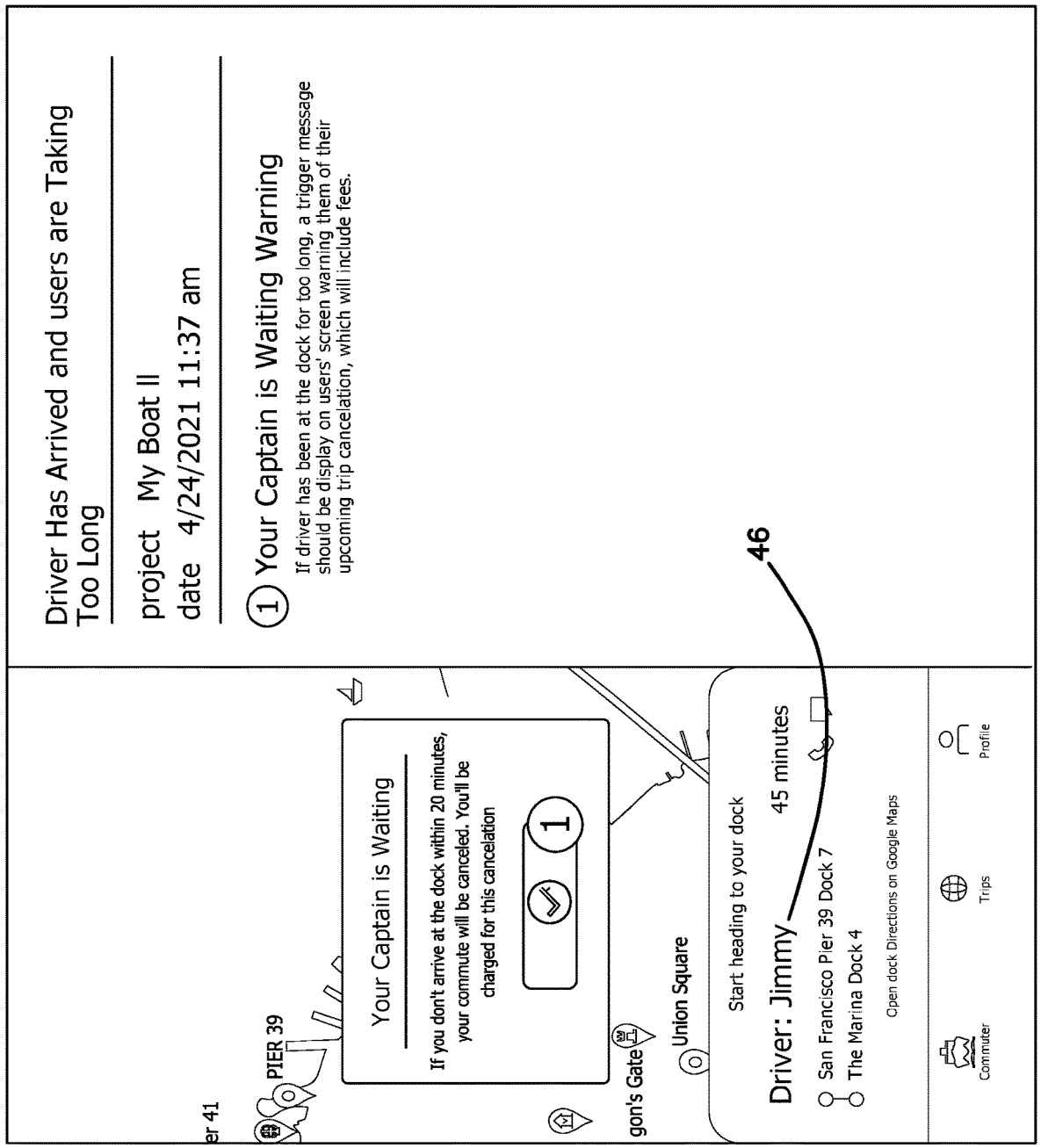
FIG. 14 is a plan view of the application of the FIG. 1 embodiment with explanatory notes regarding the boat driver waiting for the user's arrival and providing a warning about upcoming trip cancellation.
Figure 15:
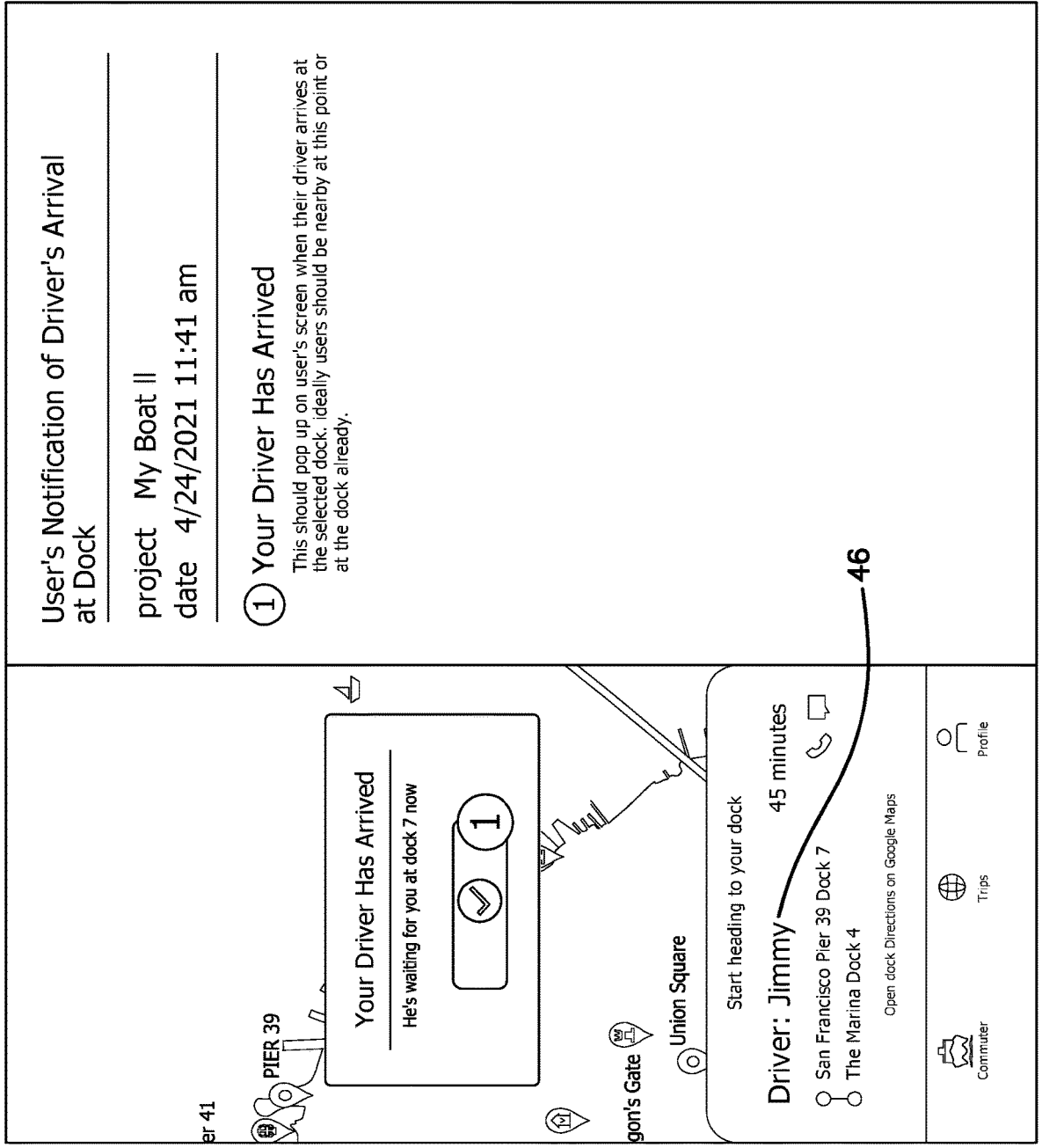
FIG. 15 is a plan view of the application of the FIG. 1 embodiment with explanatory notes related to arrival of the boat driver and providing a warning regarding trip cancellation.
Figure 16:
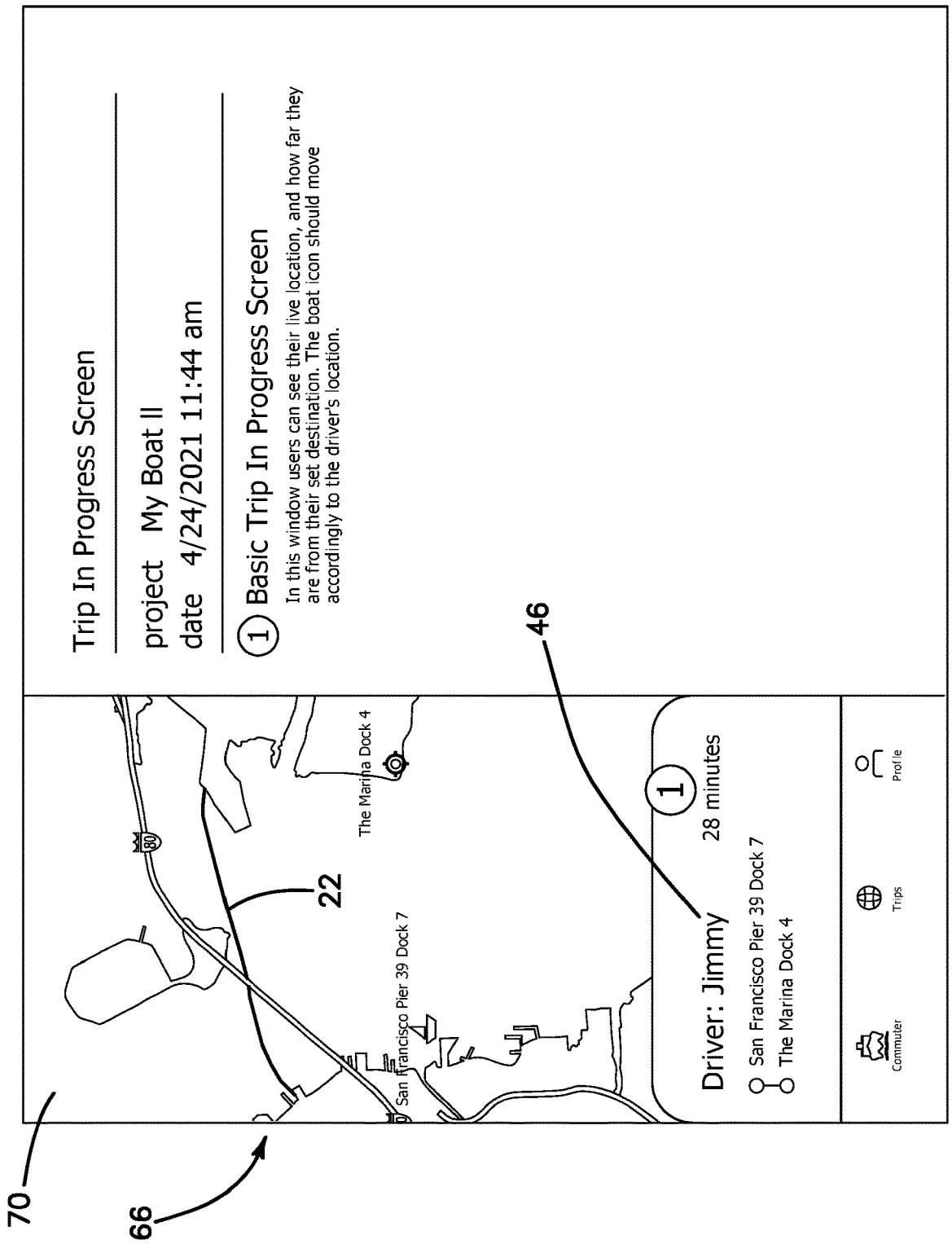
FIG. 16 is a plan view of the application of the FIG. 1 embodiment with explanatory notes for display of the trip in progress.
Figure 17:
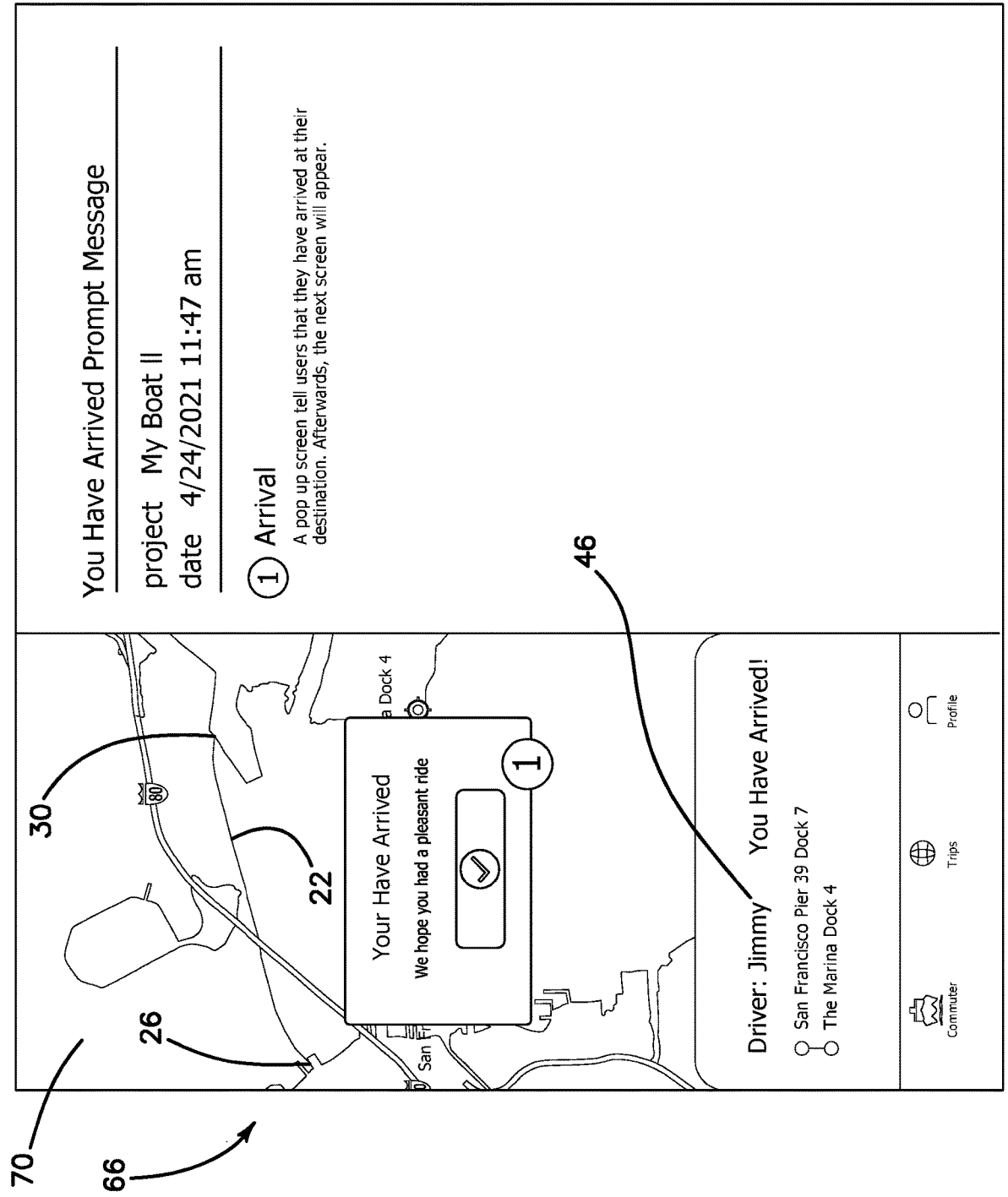
FIG. 17 is a plan view of the application of the FIG. 1 embodiment with explanatory notes indicating that the boat has arrived at the selected destination.
Figure 18:
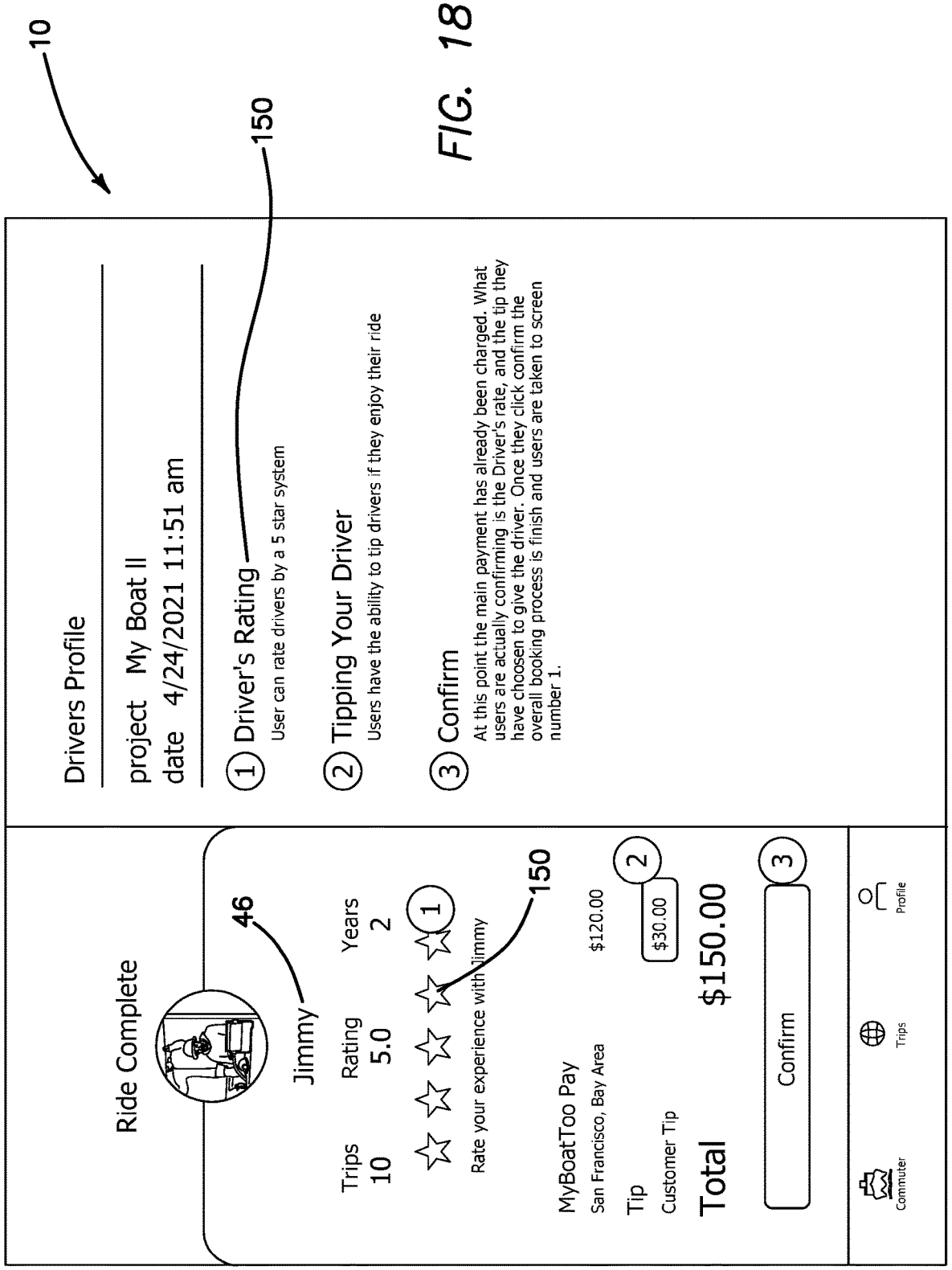
FIG. 18 is a plan view of the application of the FIG. 1 embodiment with explanatory notes for rating and tipping the driver and confirming the boat driver's rate and tip.

(3) In another variant, as illustrated in FIGS. 1-3, a costing module 74 is provided. The costing module 74 provides costing data 78 for previously traveled routes 22 and providing a determined cost 82 for the present user's 24 desired route 22, activities 54, equipment 42 and boat driver 46.

(4) In still another variant, a user profile module 86 is provided. The user profile module 86 providing for entry of the present user's 24 contact data 90, family members or other passengers 94, special needs 98, and financial data 102, including credit card data 106, the financial data 102 is available for settling route costing 110.

(5) In yet another variant, as illustrated in FIGS. 1, 3, 10 and 11, an operator qualification database 114 is provided. The operator qualification database 114 provides data regarding the skills 118 and experience 122 of available boat drivers 46, related safety records 126, certifications 130, special qualifications 134, boat experience 138 and ratings 142, the operator qualification database 114 is available to prospective users 24 prior to the scheduling of a desired route 22.

(6) In a further variant, a route rating module 146 is provided. The route rating module 146 provides a tool for the present user 24 to rate 150 and comment 154 on the selected route 22, boat 38, activities 54, equipment 42 and boat driver 46, the route ratings 150 and comments 154 submitted by users 24 to be available to prospective users 24 for review.

(7) In still a further variant, a user rating module 158 is provided. The user rating module 158 provides a tool for the boat driver 46 to rate 162 and comment 166 on his experience with the present user 24, the ratings 162 and comments 166 to be available for review by other boat drivers 46.

(8) In yet a further variant, a user onboarding module 170 is provided. The user onboarding module 170 provides tools for receiving a present user's 24 login 174 and registration 178 information, viewing suggested routes 22, selecting desired boat type 38, selecting starting 26 and ending 30 points, selecting desired activities 42, selecting trip date 182, time 186 and duration 190, identifying desired equipment 42, identifying boat driver qualifications 118, 122, 126, 130, 134, requesting custom route features 196 and confirming route request 22 and payment data 198.

(9) In still a further variant, an operator onboarding module 202 is provided. The operator onboarding module 202 provides tools for receiving a boat driver's login 206 and registration 210 information, scheduled availability 214, the operator 46 to review present route requests 22, review ratings 162 of present user 24, accept or reject requested route 22, confirm route completions 220 and payment 198.

Figure 20:
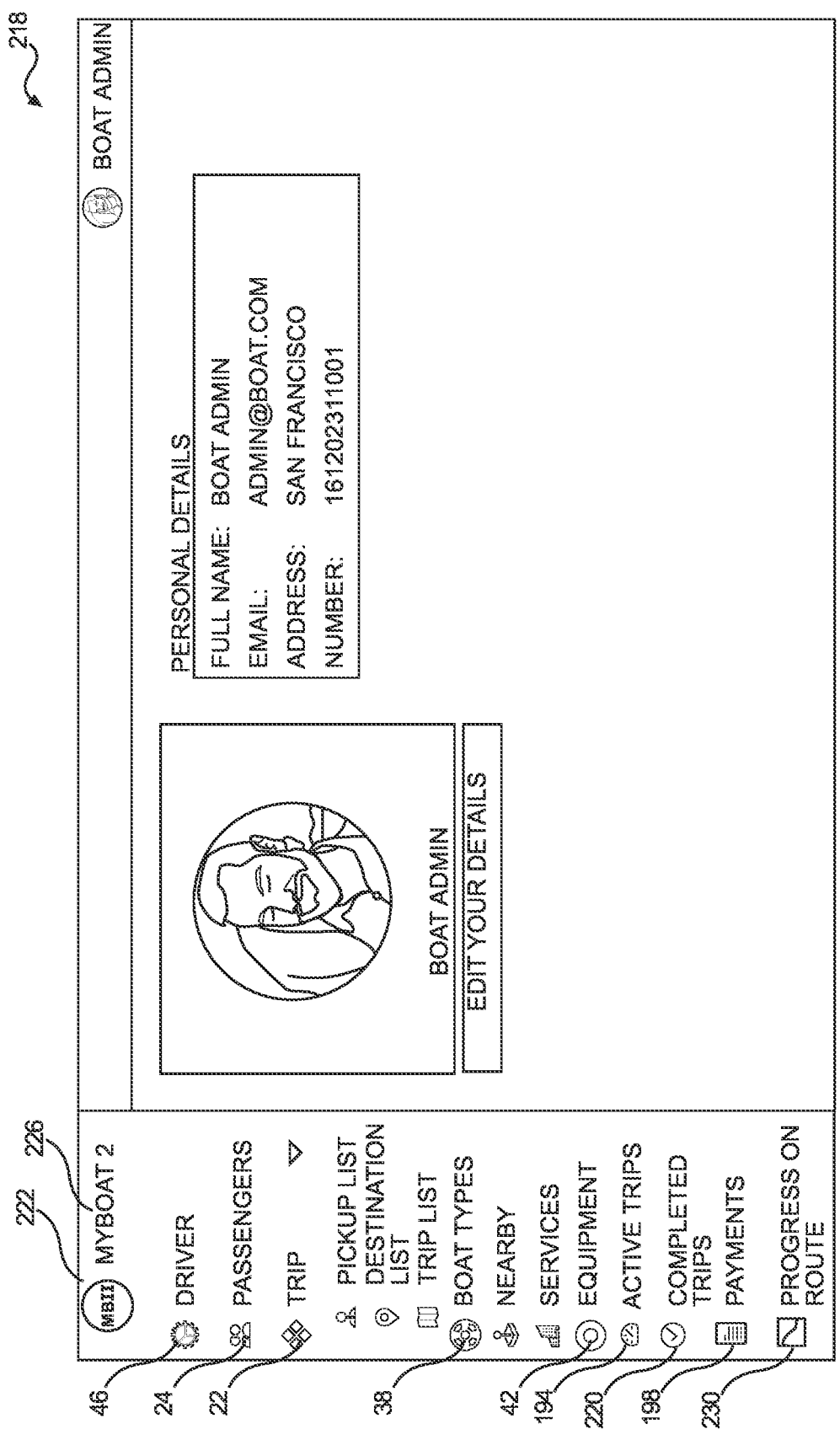
FIG. 20 is a plan view of the application of the FIG. 1 embodiment with explanatory notes for the top level administrative module.
Figure 22:
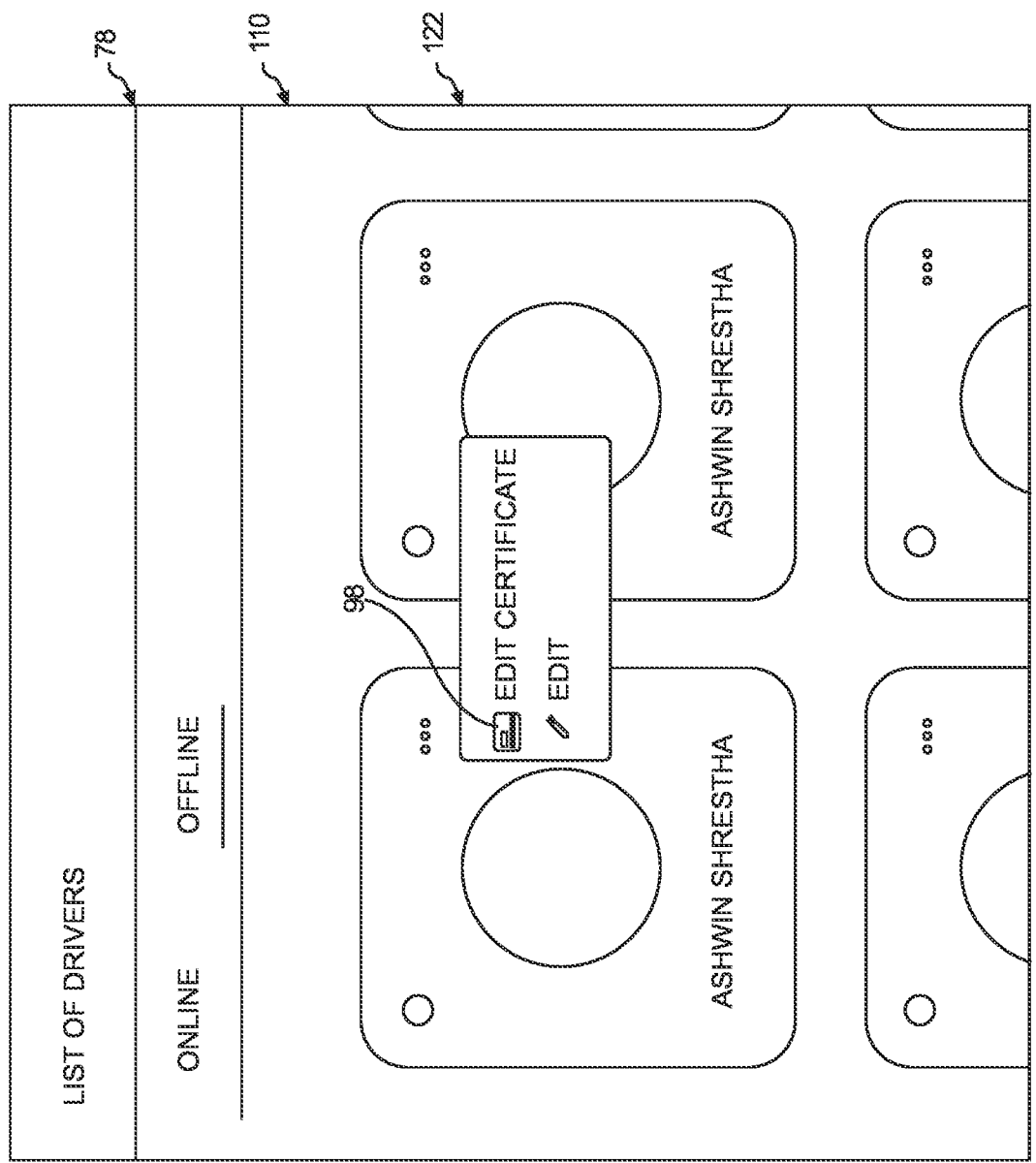
FIG. 22 is a plan view of the application of the FIG. 1 embodiment with explanatory notes for the driver management module including a screen for displaying driver certificates.
Figure 23:
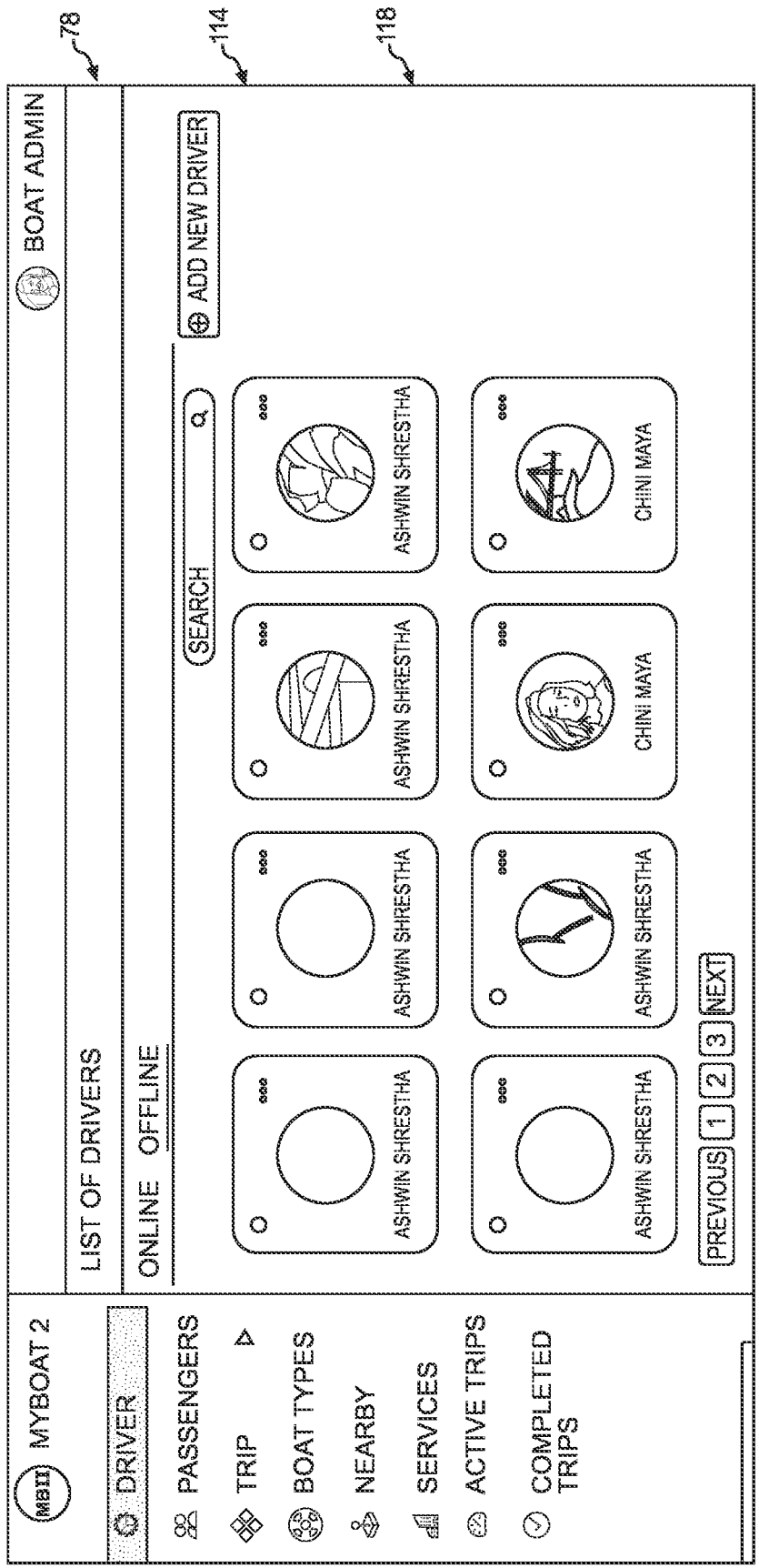
FIG. 23 is a plan view of the application of the FIG. 1 embodiment with explanatory notes for the driver management module including a screen for searching for qualified drivers.
Figure 24:
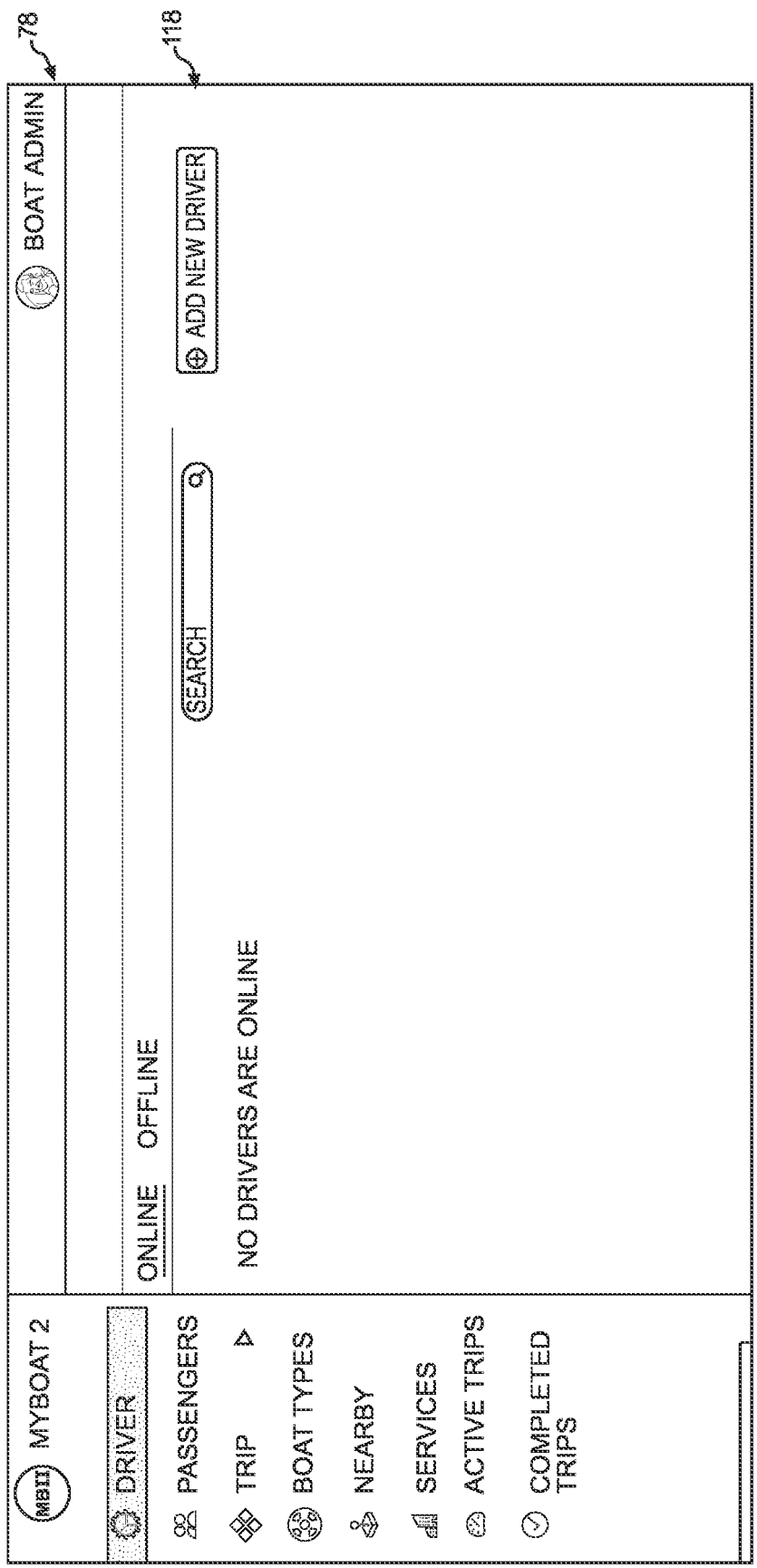
FIG. 24 is a plan view of the application of the FIG. 1 embodiment with explanatory notes for the driver management module including a screen for displaying driver search results.
Figure 26:
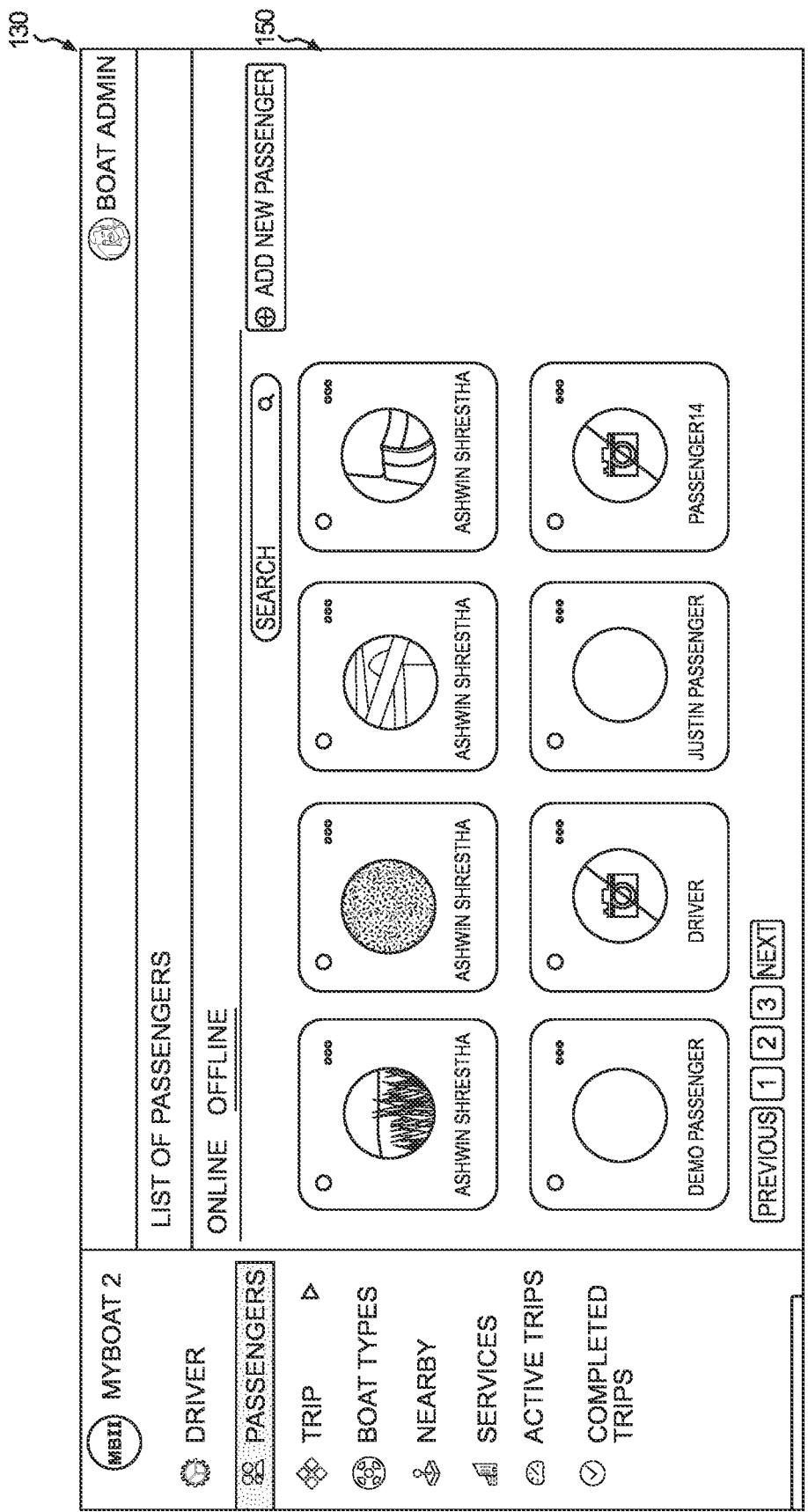
FIG. 26 is a plan view of the application of the FIG. 1 embodiment with explanatory notes for the passenger management module including a screen for displaying a list of passengers.
Figure 27:
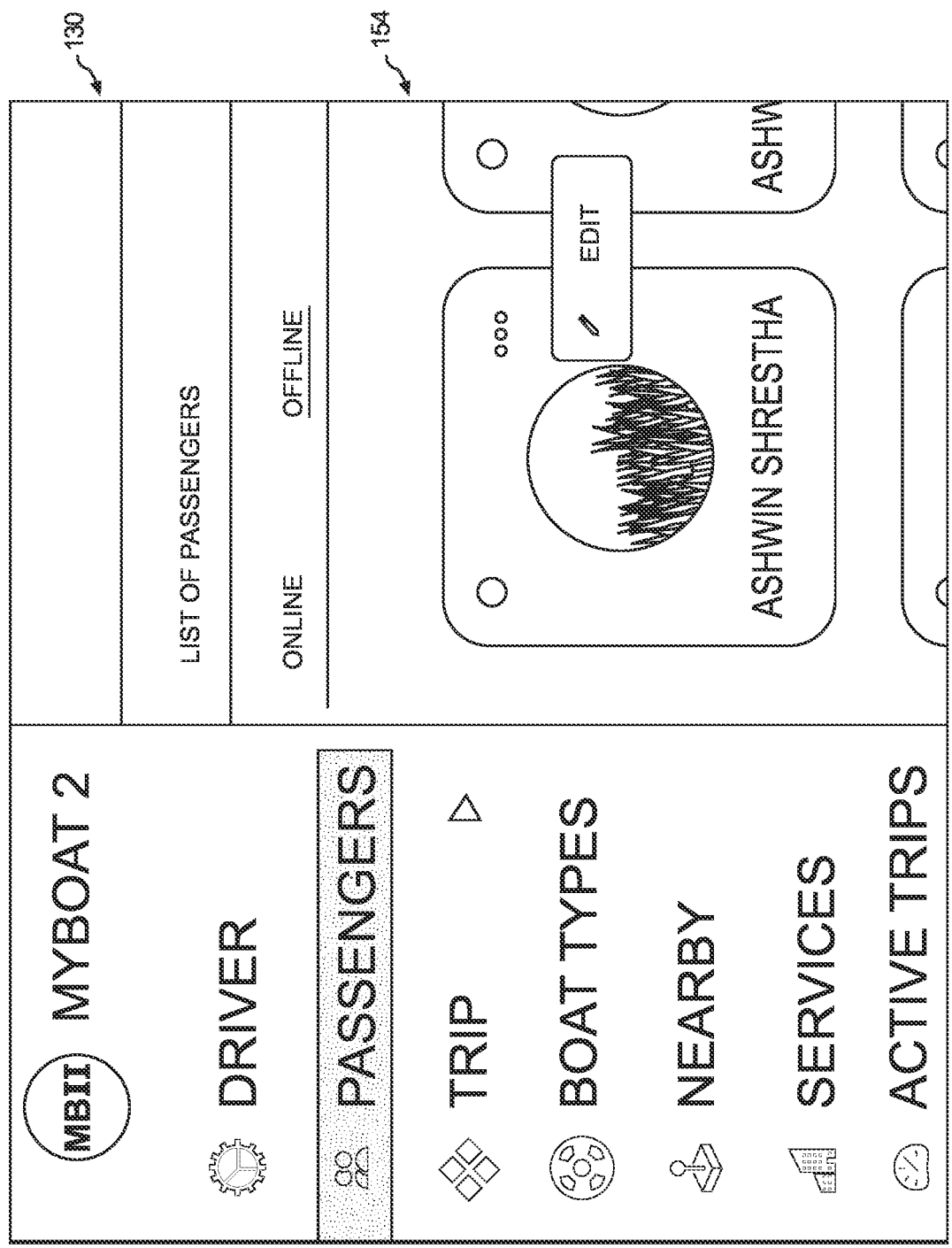
FIG. 27 is a plan view of the application of the FIG. 1 embodiment with explanatory notes for the passenger management module including a screen for searching for a particular passenger.
Figure 28:
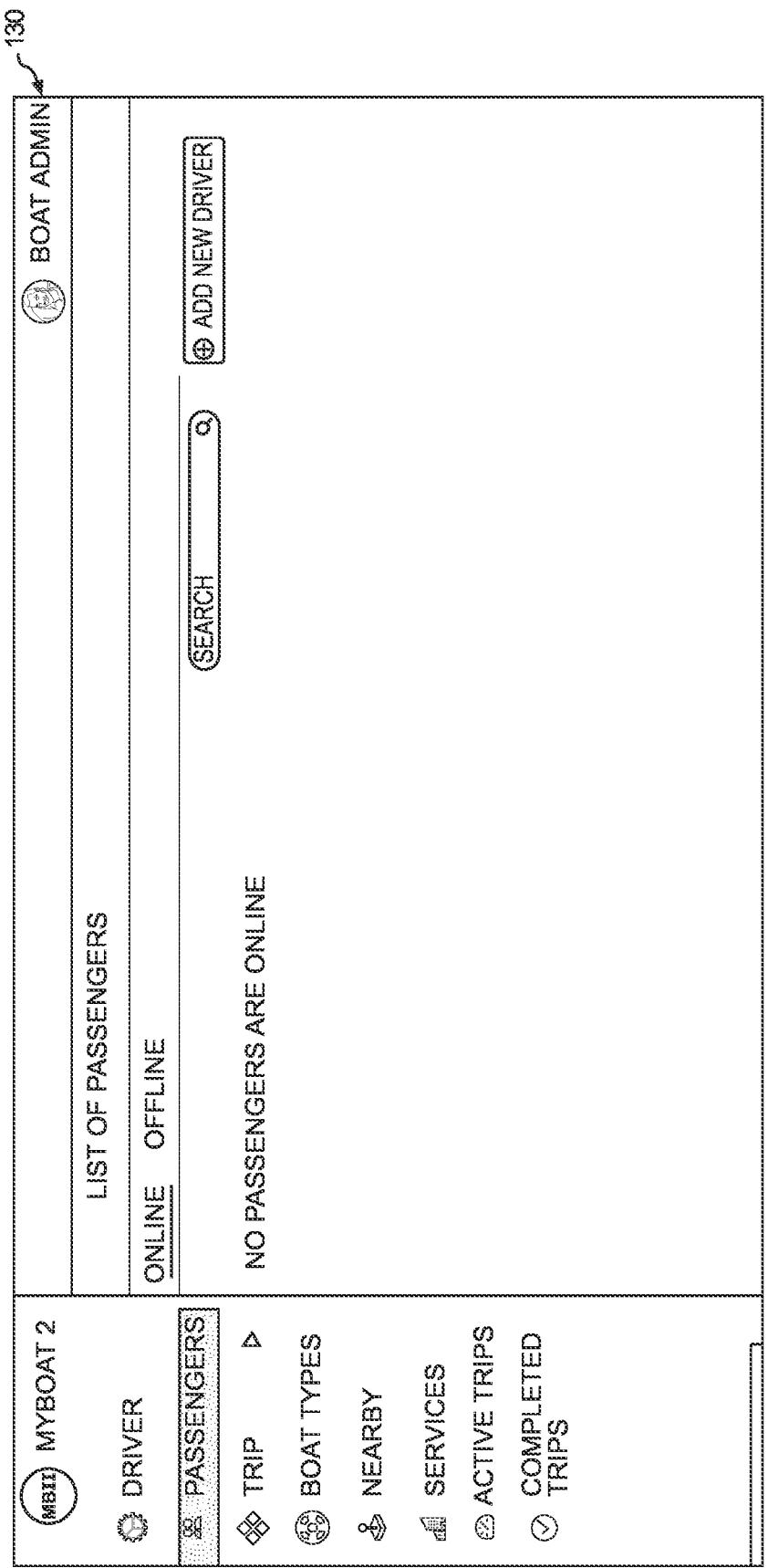
FIG. 28 is a plan view of the application of the FIG. 1 embodiment with explanatory notes for the passenger management module including a screen for displaying passenger found in a search.
Figure 33:
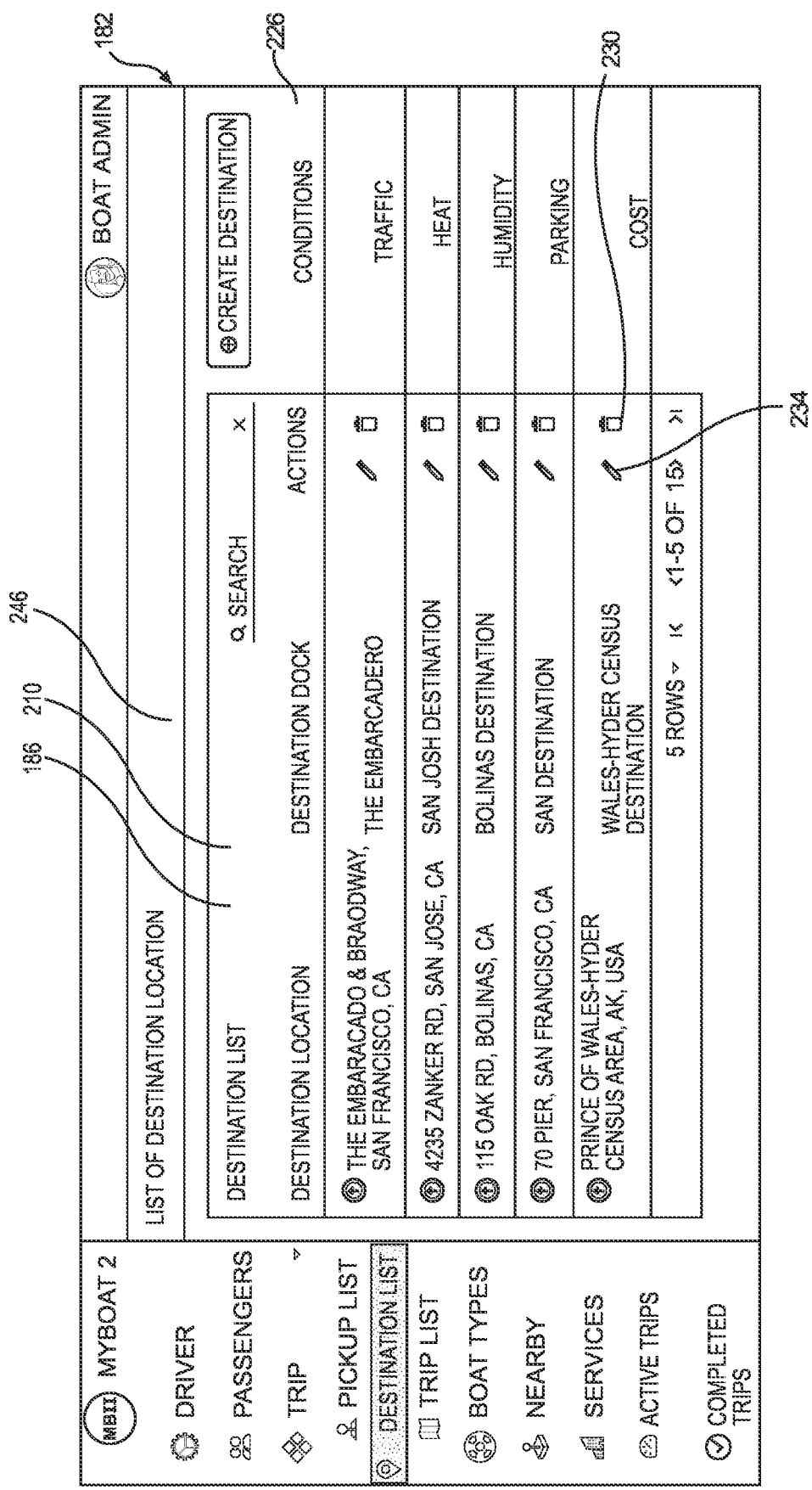
FIG. 33 is a plan view of the application of the FIG. 1 embodiment with explanatory notes for the trip management module including a listing of available trips, a listing of destination locations, a listing of conditions affecting a selected destination for a selected trip, a listing of erased trips, a screen for editing a destination location for a whole trip, and a screen 246 for creating a destination location.
Figure 34:
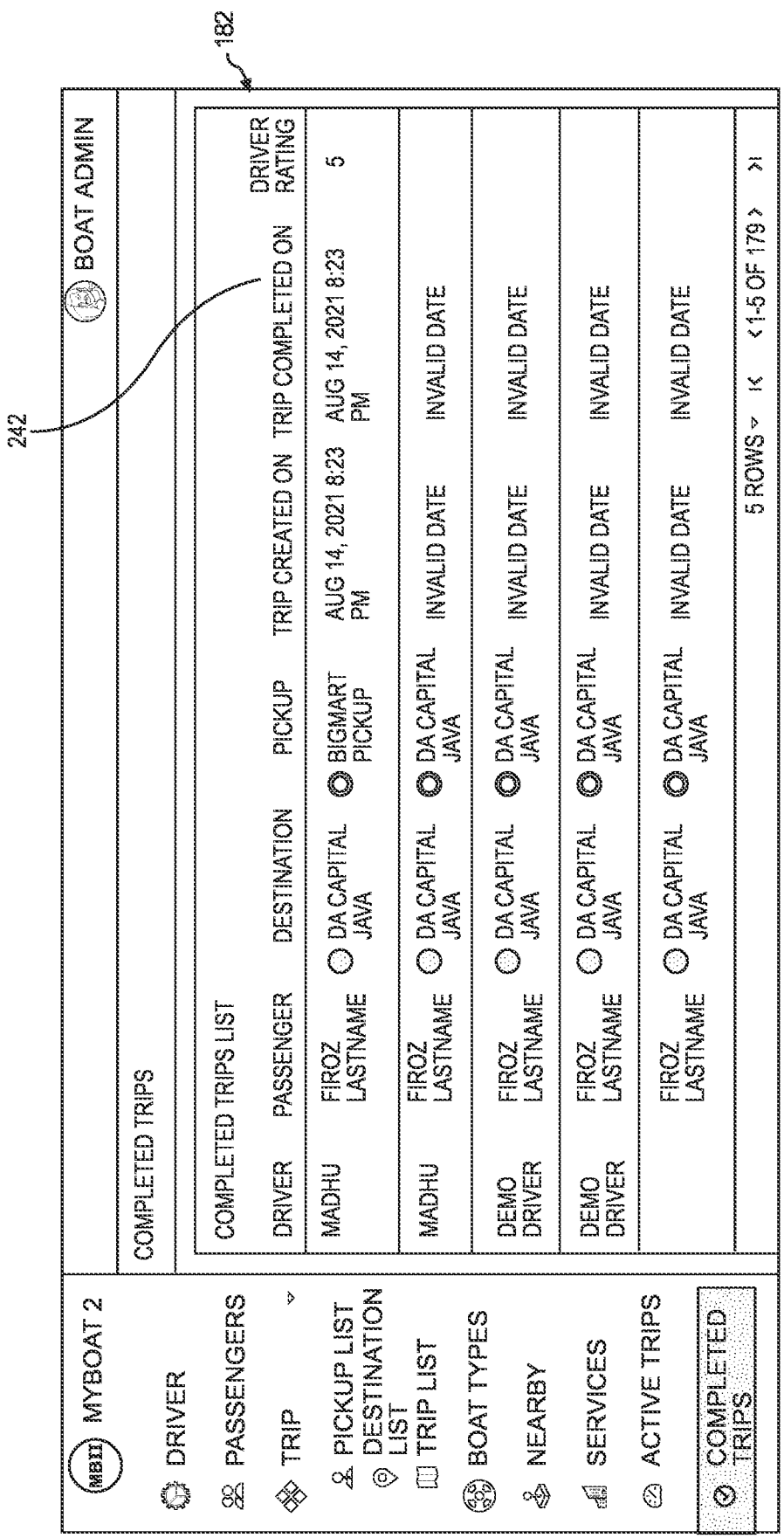
FIG. 34 is a plan view of the application of the FIG. 1 embodiment with explanatory notes for the trip management module including a listing of completed trips.
Figure 35:
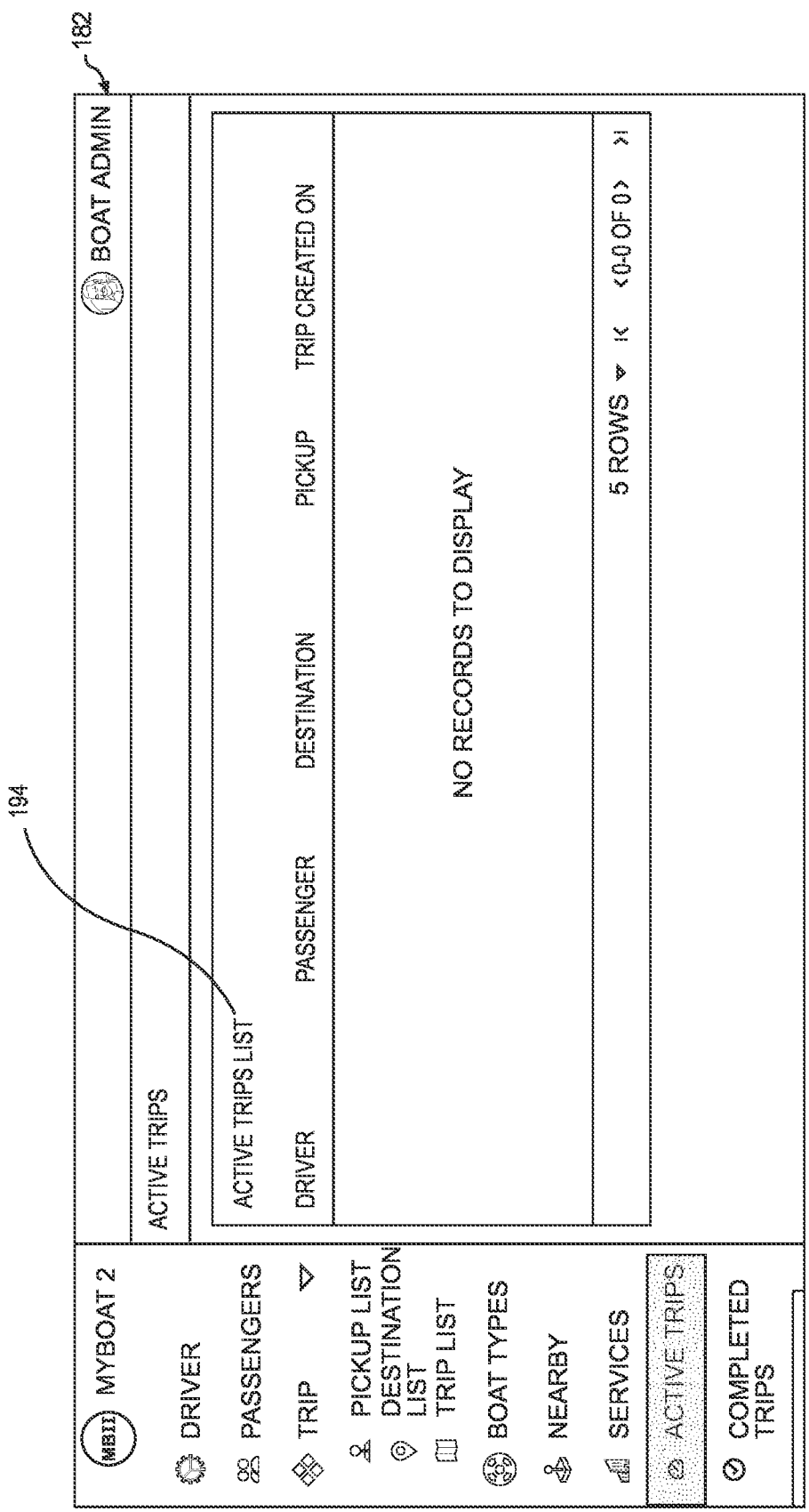
FIG. 35 is a plan view of the application of the FIG. 1 embodiment with explanatory notes for the trip management module including a listing of presently active trips.
Figure 36:
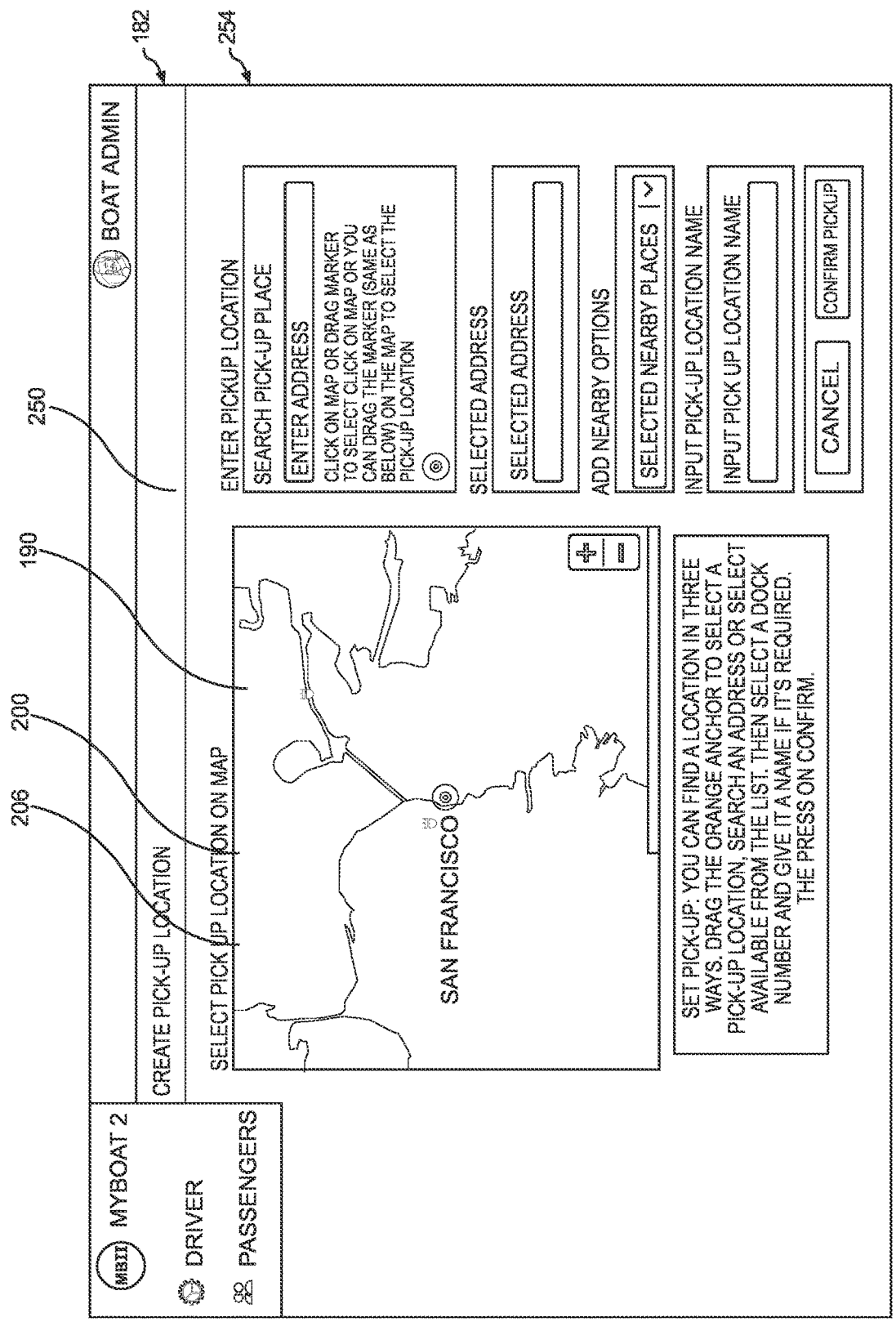
FIG. 36 is a plan view of the application of the FIG. 1 embodiment with explanatory notes for the trip management module including maps of available trips, maps of presently active trips, maps of pick-up locations, a screen for creating a pick up location, and a screen for creating a trip.
Figure 37:
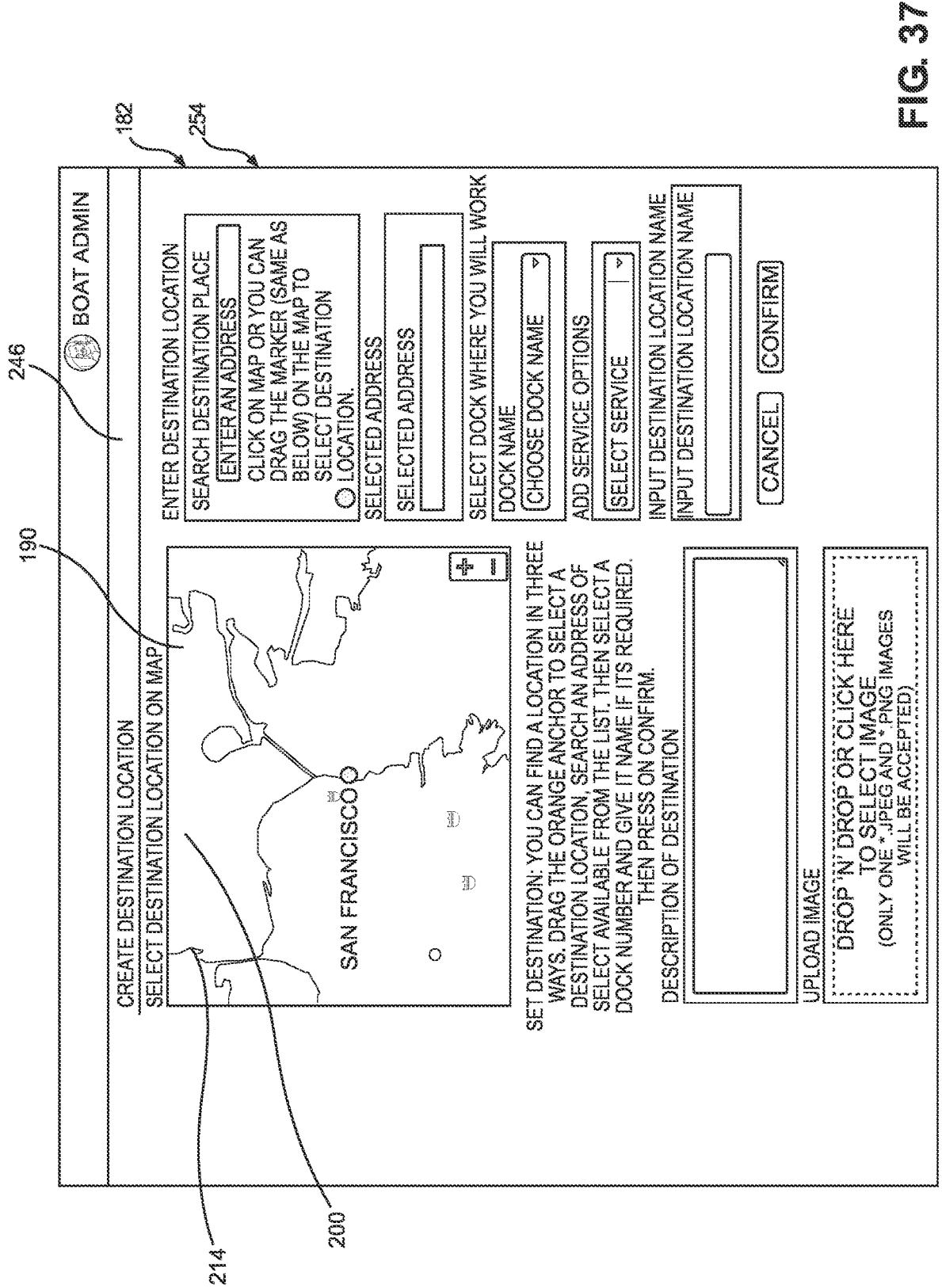
FIG. 37 is a plan view of the application of the FIG. 1 embodiment with explanatory notes for the trip management module including, maps of available trips, a screen for creating a destination location, and a screen for creating a trip.
Figure 38:
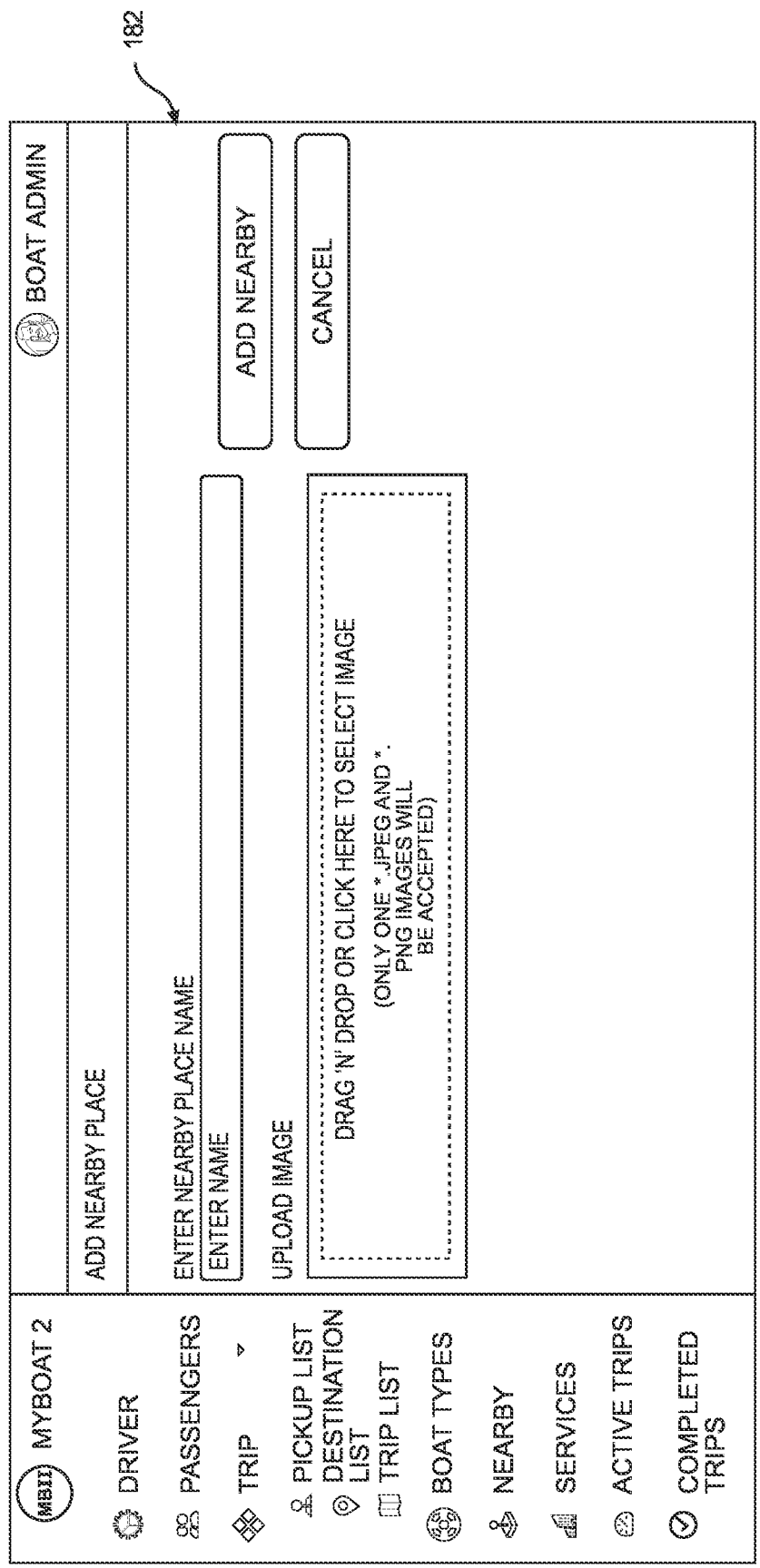
FIG. 38 is a plan view of the application of the FIG. 1 embodiment with explanatory notes for the trip management module including a screen for adding a nearby place.
Figure 39:
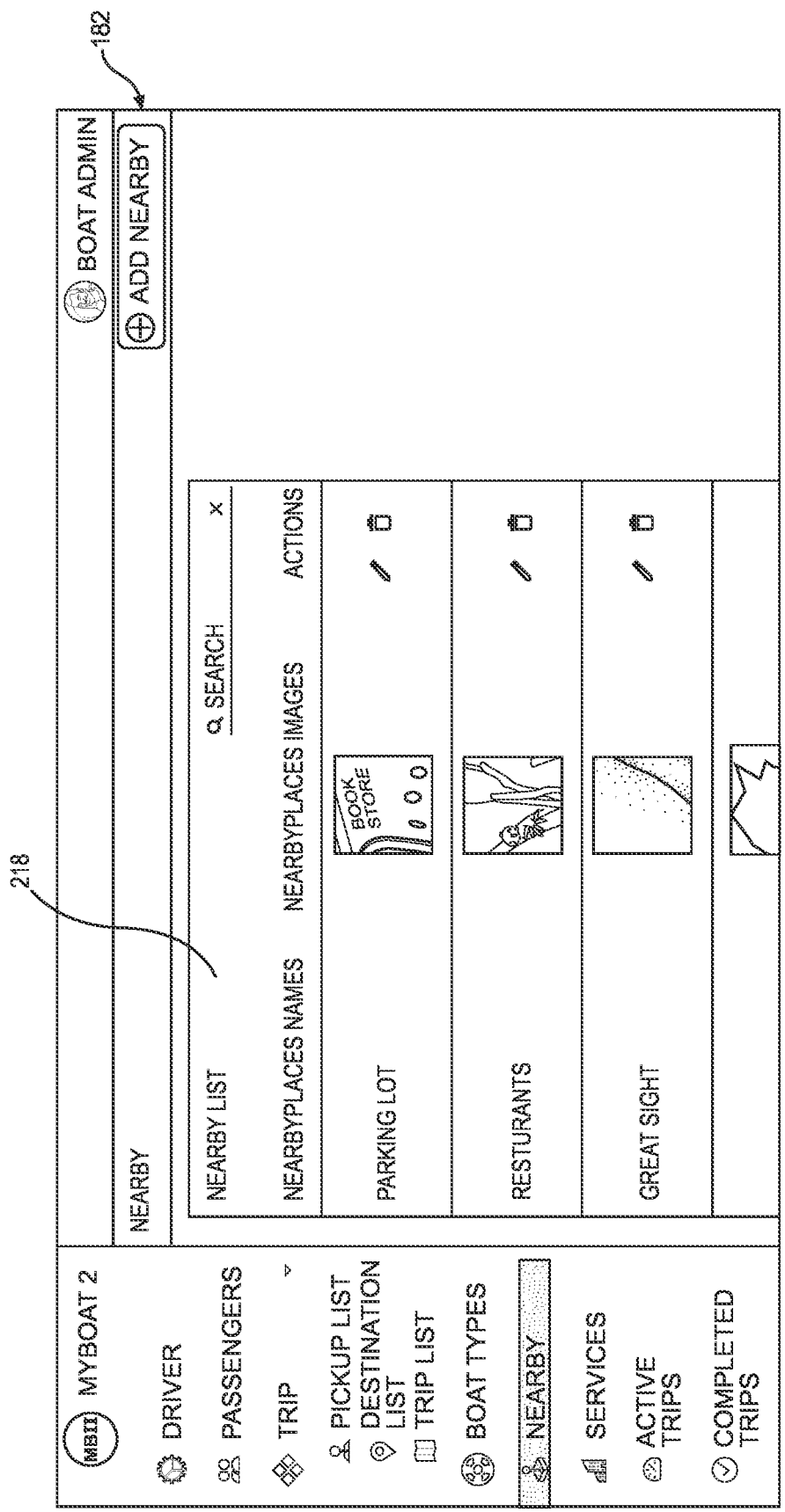
FIG. 39 is a plan view of the application of the FIG. 1 embodiment with explanatory notes for the trip management module including a listing of nearby locations.
Figure 40:
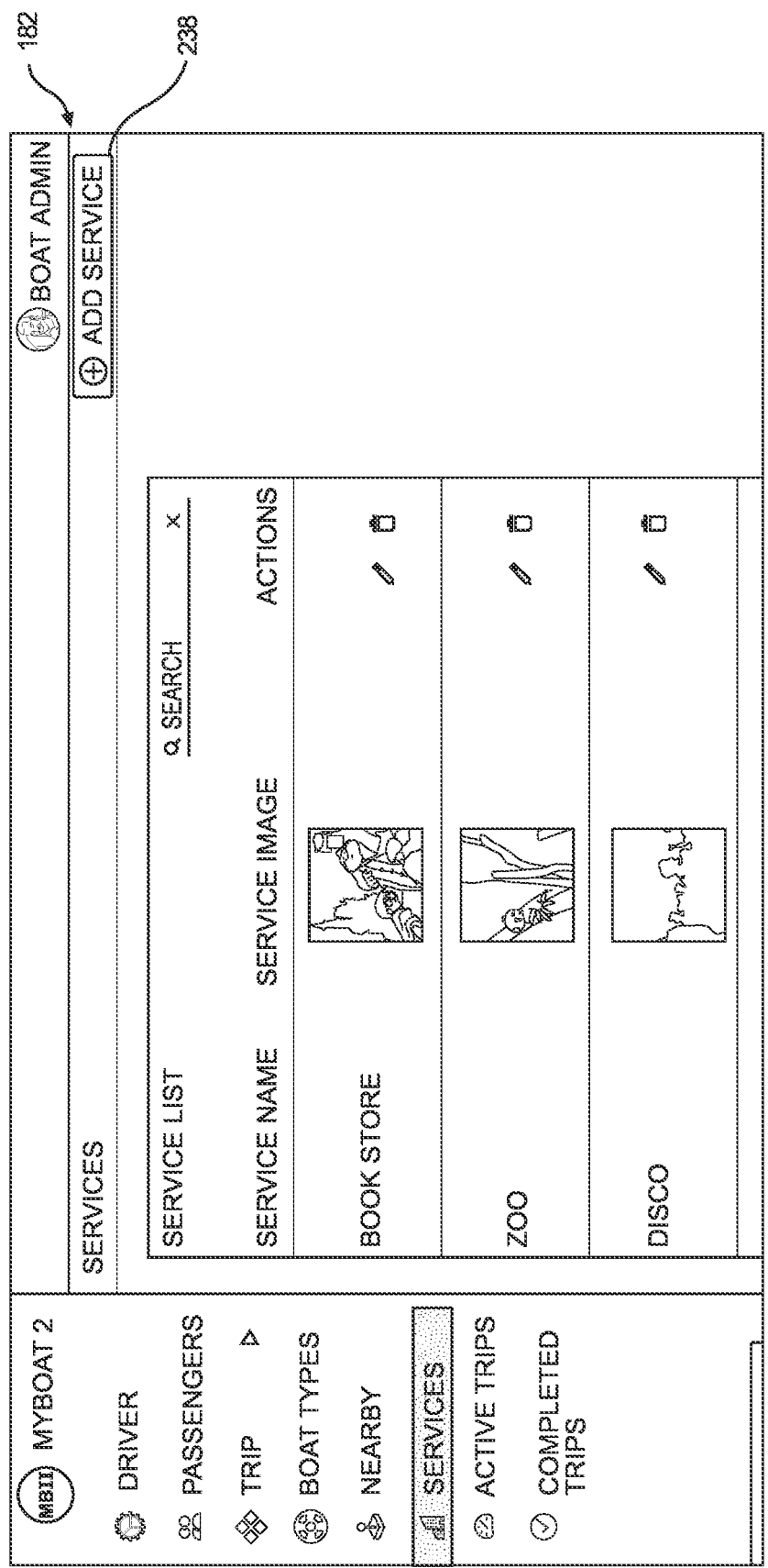
FIG. 40 is a plan view of the application of the FIG. 1 embodiment with explanatory notes for the trip management module including a screen listing available services.
Figure 41:
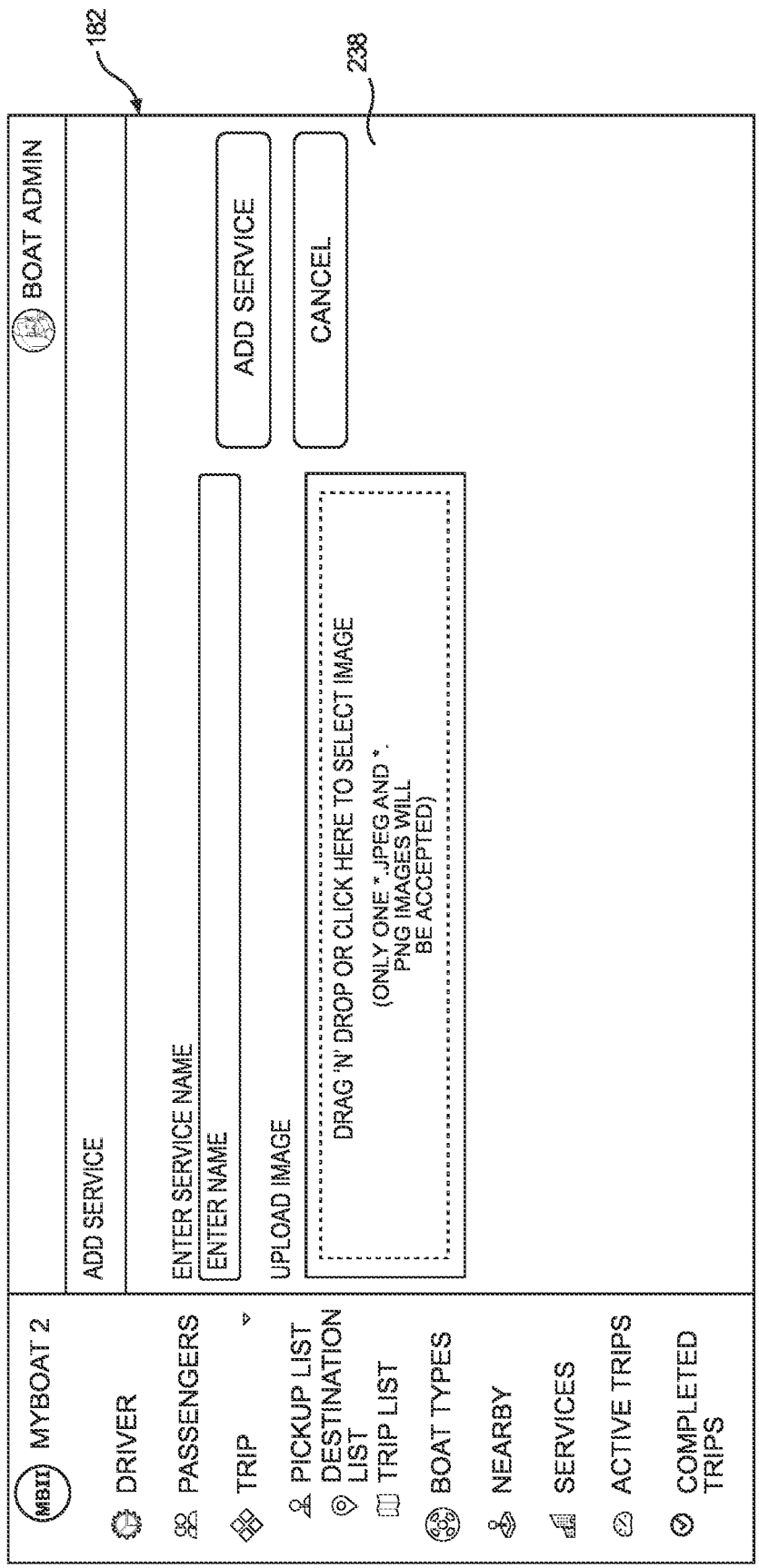
FIG. 41 is a plan view of the application of the FIG. 1 embodiment with explanatory notes for the trip management module including a screen for adding additional services to a trip.

(10) In yet a further variant, as illustrated in FIG. 20, at least one system administration module 218 is provided. The at least one system administration module 218 provides written 222 and graphical 226 reports on present users 24 serviced by the system 10, their routes 22, progress on the routes 230 and payment status 198, boat drivers 46 currently employed by the system 10, the boats 38 in use by the boat drivers 46, equipment 42 in use and future availability for the boat drivers 46.

(11) In another variant of the invention, as illustrated in FIGS. 1 and 19, the boat sharing system 10 is accessible to the users 24 and boat drivers 46 via cellular telephone systems and equipment 234.

(12) In still another variant, the selected parameter 32 identifies vessel distance traveled.

(13) In yet another variant, the selected parameter 32 identifies vessel speed.

(14) In a further variant, the selected parameter 32 identifies route elapsed time.

(15) In still a further variant, the selected parameter 32 identifies vessel fuel remaining.

(16) In yet a further variant, the selected parameter 32 identifies weather conditions,

(17) In another variant, the selected parameter 32 identifies emergency equipment levels.

(18) In still another variant, the selected parameter 32 identifies a fire extinguisher count.

(19) In yet another variant, the selected parameter 32 identifies onboard air quality levels.

(20) In a further variant, the selected parameter 32 identifies vessel engine RPM level.

(21) In still a further variant, the selected parameter 32 identifies vessel engine temperature.

(22) In yet a further variant, the selected parameter 32 identifies vessel engine oil pressure.

(23) In another variant, the selected parameter 32 identifies vessel engine service hours.

(24) In still another variant, the selected parameter 32 identifies vessel oil temperature.

(25) In a further variant, as illustrated in FIGS. 21-24, a driver management module 78 is provided. The driver management module 78 provides a screen 82 for input of driver identification and contact information 86, qualifications 90, experience 94, certificates 98, photos of boats for which the driver is qualified 102 and driver banking information 106, a screen 110 for displaying driver certificates, a screen 114 for searching for qualified drivers, a screen 118 for displaying driver search results, a screen 122 for displaying a profile of a selected driver and a screen 126 for displaying a trip history for the selected driver.

(26) In still a further variant, as illustrated in FIGS. 25-30, a passenger management module 130 is provided. The passenger management module 130 provides a screen 134 for input of passenger identification 138, contact information 142, and passenger banking information 146, a screen 150 for searching for a particular passenger, a screen 154 for displaying a list of passengers, a screen 158 for displaying details of a present selected trip, and a screen 162 for displaying the particular passenger's trip history.

(27) In yet a further variant, as illustrated in FIG. 31, a boat information management module 166 is provided. The boat information management module 166 provides a boat category listing 170, a screen 174 for adding boats to the boat category listing and a screen 178 displaying recently erased boat listings.

(28) In a final variant, as illustrated in FIGS. 32-41, a trip management module 182 is provided. The trip management module 182 provides a listing of available trips 186, maps of available trips 190, listing of presently active trips 194, maps of presently active trips 200 a listing of pick-up locations 202, maps of pick-up locations 206, a listing of destination locations 210, maps of destination locations 214, a listing of nearby locations 218, maps of nearby locations (not shown), a listing 226 of conditions affecting a selected destination for a selected trip, a listing of erased trips 230, a screen 234 for editing a destination location for a whole trip, a screen 238 for adding additional services to a trip, a listing of completed trips 242, a screen 246 for creating a destination location, a screen 250 for creating a pick up location, a screen 254 for creating a trip.

The boat sharing system 10 has been described with reference to particular embodiments. Other modifications and enhancements can be made without departing from the spirit and scope of the claims that follow.

The invention claimed is:

1. A boat sharing system comprising:
   non-transitory computer readable memory for receiving and storing route data for routes previously traveled by users, said route data comprising starting and ending points and points of interest along said routes;
   said non-transitory computer readable memory receiving and storing data related to boat types, equipment for boating activities and boat drivers provided;
   a processing system accessing said computer readable memory and configured to:
   display previously stored route data, boat types, activities and equipment and boat drivers provided;
   receive and store route data and trip timing for at least one route desired by a present user;
   receive and store data related to a boat type, equipment and activity desires of said present user;
   receive and store data related to boat driver requirement of said present user;
   compare said present user's desired route, timing, activity, equipment and boat driver requirements with previously stored route, boat, activity, equipment and boat driver data;
   provide at least one previously stored set of route, boat, activity, equipment and operator data as an option for said present user;
   provide suggested timing, starting and ending points for said suggested route;
   permit said present user to confirm selection of said suggested route;

a portable and installable telemetry system for monitoring a fleet of rental vessels, comprising:
- one or more rental vessel kits, each kit including a plurality of parameter monitors, each such monitor having the capability of sensing a present level of a selected parameter and transmitting a parameter monitor signal corresponding to that level;
- a base station comprising:
  - a receiving apparatus configured to receive signals from one or more parameter monitors;
  - one or more data processing units configured to process signals received from said parameter monitors to construct one or more status indicators related to said parameter monitor signals;
- an alarm device configured to indicate an alarm condition in response to one or more status indicators indicating one or more conditions preselected as alarm conditions;
- wherein each parameter monitor includes means for operational attachment to a location on or within the rental vessel, as required for parameter level sensing;
- at least one system administration module, said at least one system administration module providing written and graphical reports on present users being serviced by the system, their routes, progress on said routes and payment status, boat drivers currently employed by said system, the boats in use by said boat drivers, equipment in use and future availability for said boat drivers; and
- a trip management module, said trip management module providing a listing of available trips, maps of available trips, listing of presently active trips, maps of presently active trips, a listing of pick-up locations, maps of pick-up locations, a listing of destination locations, maps of destination locations, a listing of nearby locations, maps of nearby locations, a listing of conditions affecting a selected destination for a selected trip, a listing of erased trips, a screen for editing a destination location for a whole trip, a screen for adding additional services to a trip, a listing of completed trips, a screen for creating a destination location, a screen for creating a pick up location and a screen for creating a trip.

2. The boat sharing system as described in claim 1, further comprising a mapping system, said mapping system providing said user with a real-time visual image illustrating the arrival of said boat at a route starting point, progress of said boat along a selected route and anticipated arrival at a selected ending point.

3. The boat sharing system as described in claim 1, further comprising a costing module, said costing module providing costing data for previously traveled routes and providing a determined cost for said present user's desired route, activities, equipment and boat driver.

4. The boat sharing system as described in claim 1, further comprising a user profile module, said user profile module providing for entry of said present user's contact data, family members or other passengers, special needs, and financial data, including credit card data, said financial data being available for settling route costing.

5. The boat sharing system as described in claim 1, further comprising an operator qualification database, said operator qualification database providing data regarding the skills and experience of available boat drivers, related safety records, certifications, special qualifications, boat experience and ratings, said operator qualification database being available to prospective users prior to the scheduling of a desired route.

6. The boat sharing system as described in claim 1, further comprising a route rating module, said route rating module providing a tool for said present user to rate and comment on said selected route, boat, activities, equipment and boat driver, said route ratings and comments submitted by users to be available to prospective users for review.

7. The boat sharing system as described in claim 1, further comprising a user rating module, said user rating module providing a tool for said boat driver to rate and comment on his experience with said present user, said ratings and comments to be available for review by other boat drivers.

8. The boat sharing system as described in claim 1, further comprising a user onboarding module, said user onboarding module providing tools for receiving a present user's login and registration information, viewing suggested routes, selecting desired boat type, selecting starting and ending points, selecting desired activities, selecting trip date, time and duration, identifying desired equipment, identifying boat driver qualifications, requesting custom route features and confirming route request and payment data.

9. The boat sharing system as described in claim 1, further comprising an operator onboarding module, operator onboarding module providing tools for receiving a boat driver's login and registration information, scheduled availability, said operator to review present route requests, review ratings of present user, accept or reject requested route, confirm route completions and payment.

10. The boat sharing system as described in claim 1 being accessible to said users and said boat drivers via cellular telephone systems and equipment.

11. The boat sharing system as described in claim 1, wherein said selected parameter identifies vessel distance traveled.

12. The boat sharing system as described in claim 1, wherein said selected parameter identifies vessel speed.

13. The boat sharing system as described in claim 1, wherein said selected parameter identifies route elapsed time.

14. The boat sharing system as described in claim 1, wherein said selected parameter identifies vessel fuel remaining.

15. The boat sharing system as described in claim 1, wherein said selected parameter identifies weather conditions.

16. The boat sharing system as described in claim 1, wherein said selected parameter identifies emergency equipment levels.

17. The boat sharing system as described in claim 1, wherein said selected parameter identifies a fire extinguisher count.

18. The boat sharing system as described in claim 1, wherein said selected parameter identifies onboard air quality levels.

19. The boat sharing system as described in claim 1, wherein said selected parameter identifies vessel engine RPM level.

20. The boat sharing system as described in claim 1, wherein said selected parameter identifies vessel engine temperature.

21. The boat sharing system as described in claim 1, wherein said selected parameter identifies vessel engine oil pressure.

22. The boat sharing system as described in claim 1, wherein said selected parameter identifies vessel engine service hours.

23. The boat sharing system as described in claim 1, wherein said selected parameter identifies vessel oil temperature.

24. The boat sharing system as described in claim 1, further comprising a driver management module, said driver management module providing a screen for input of driver identification and contact information, qualifications, experience, certificates, photos of boats for which the driver is qualified and driver banking information, a screen for displaying driver certificates, a screen for searching for qualified drivers, a screen for displaying driver search results, a screen for displaying a profile of a selected driver and a screen for displaying a trip history for said selected driver.

25. The boat sharing system as described in claim 11, further comprising a passenger management module, said passenger management module providing a screen for input of passenger identification, contact information, and passenger banking information, a screen for searching for a particular passenger, a screen for displaying a list of passengers, a screen for displaying details of a present selected trip, and a screen for displaying said particular passenger's trip history.

26. The boat sharing system as described in claim 11, further comprising a boat information management module, said boat information management module providing a boat category listing, a screen for adding boats to said boat category listing and a screen displaying recently erased boat listings.

* * * * *